(12) United States Patent
Hori et al.

(10) Patent No.: US 11,646,915 B2
(45) Date of Patent: May 9, 2023

(54) DEVICE AND METHOD FOR RECEIVER OFFSET CALIBRATION

(71) Applicant: Synaptics Incorporated, San Jose, CA (US)

(72) Inventors: Yoshihiko Hori, Kanagawa (JP); Takefumi Seno, Tokyo (JP); Takashi Tamura, Tokyo (JP); Kazuhiko Kanda, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/406,164

(22) Filed: Aug. 19, 2021

(65) Prior Publication Data
US 2023/0058759 A1    Feb. 23, 2023

(51) Int. Cl.
*H04L 25/02* (2006.01)
*H04B 1/18* (2006.01)
*H04B 1/16* (2006.01)

(52) U.S. Cl.
CPC ....... *H04L 25/0276* (2013.01); *H04B 1/1607* (2013.01); *H04B 1/18* (2013.01)

(58) Field of Classification Search
CPC ..... H04L 25/06; H04L 25/061; H04L 25/065; H04L 25/0276; H04B 1/1607; H04B 1/18
See application file for complete search history.

(56) References Cited

U.S. PATENT DOCUMENTS

| | | | |
|---|---|---|---|
| 6,515,464 B1* | 2/2003 | Darmawaskita | H03F 3/45977 324/606 |
| 9,276,598 B1* | 3/2016 | Li | H03M 1/1057 |
| 9,959,805 B2* | 5/2018 | Itoigawa | H03L 7/00 |
| 2007/0013440 A1* | 1/2007 | Chen | H03F 3/45973 330/9 |
| 2011/0074505 A1* | 3/2011 | Chiang | H03F 3/45475 327/307 |
| 2013/0241599 A1* | 9/2013 | Soenen | H03K 5/125 327/65 |
| 2022/0209681 A1* | 6/2022 | Reitsma | G01D 21/00 |

OTHER PUBLICATIONS

Lecture Notes on Linear Search, Sep. 9, 2014, pp. 1-9.*

* cited by examiner

*Primary Examiner* — Sophia Vlahos
(74) *Attorney, Agent, or Firm* — Ferguson Braswell Fraser Kubasta PC

(57) ABSTRACT

An integrated circuit includes a plurality of signal inputs, a receiver, calibration circuitry, and input switch circuitry. The receiver includes differential input terminals. The calibration circuitry is configured to calibrate an input offset between the differential input terminals of the receiver in response to the integrated circuit being placed in a calibration mode. The input switch circuitry is configured to switch electrical connections between the plurality of signal inputs and the differential input terminals of the receiver in response to the integrated circuit being placed in a mode different from the calibration mode. The input switch circuitry is further configured to electrically disconnect the plurality of signal inputs from the differential input terminals of the receiver in response to the integrated circuit being placed in the calibration mode.

15 Claims, 23 Drawing Sheets

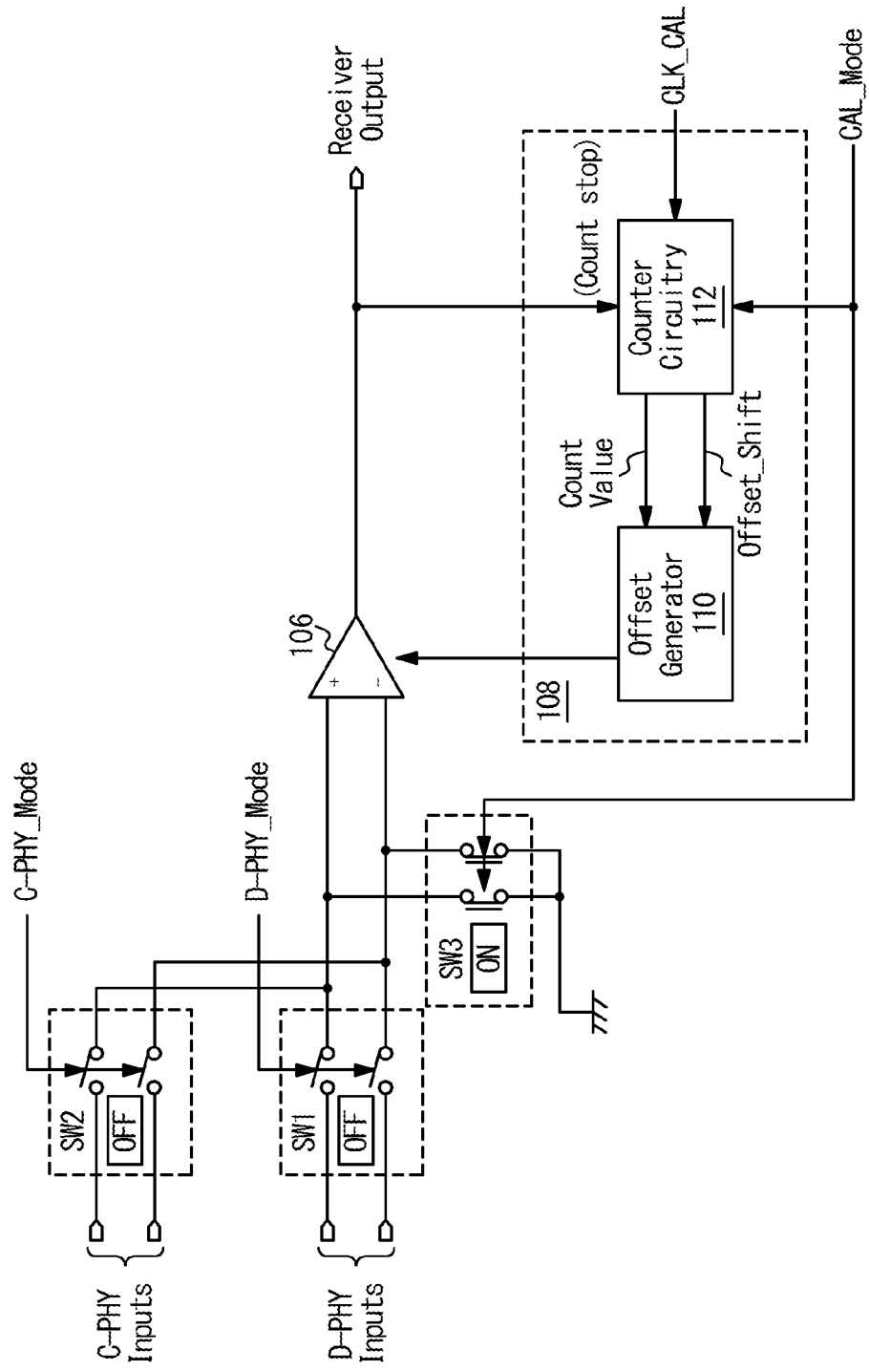
F I G. 4

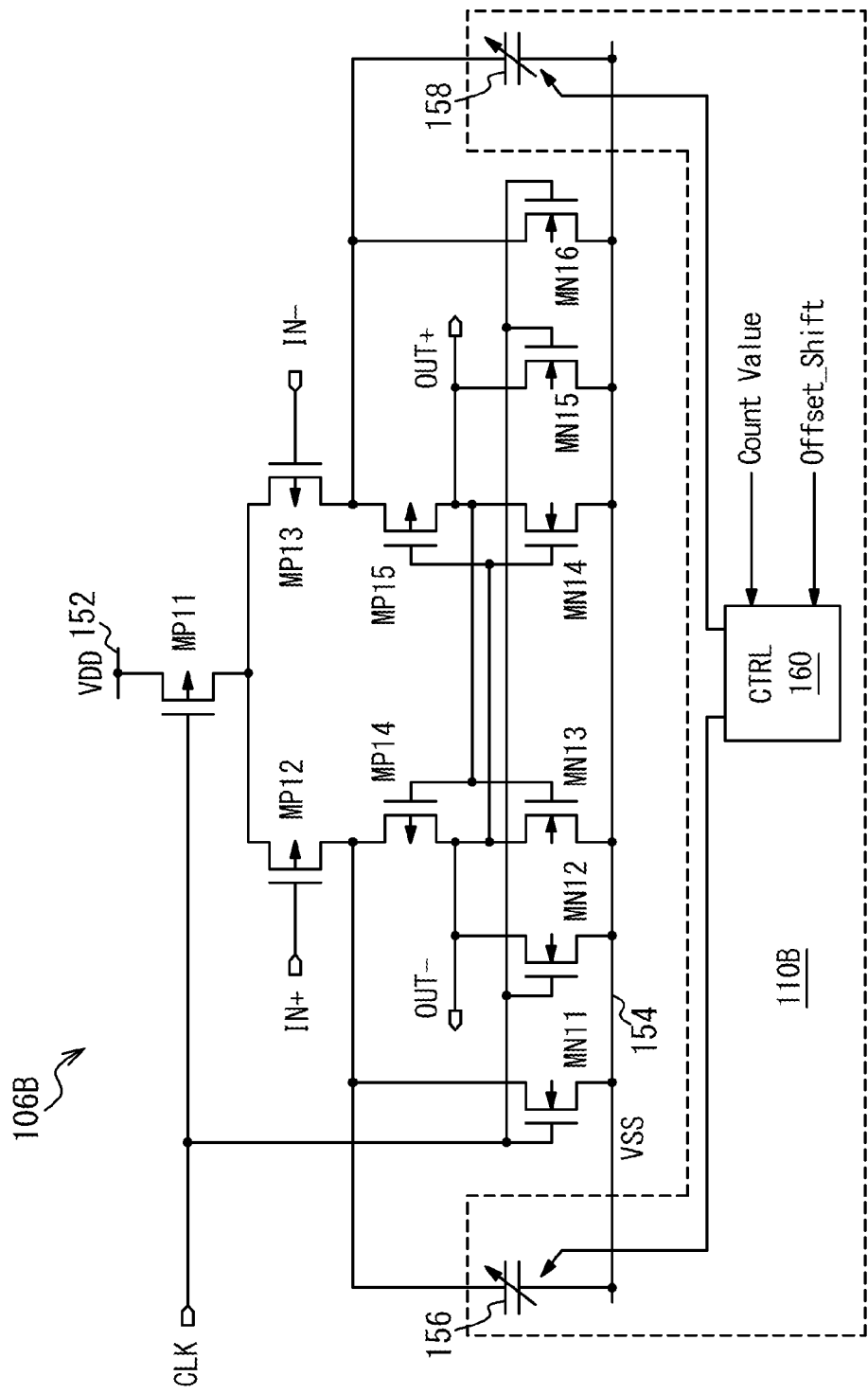

F I G. 14
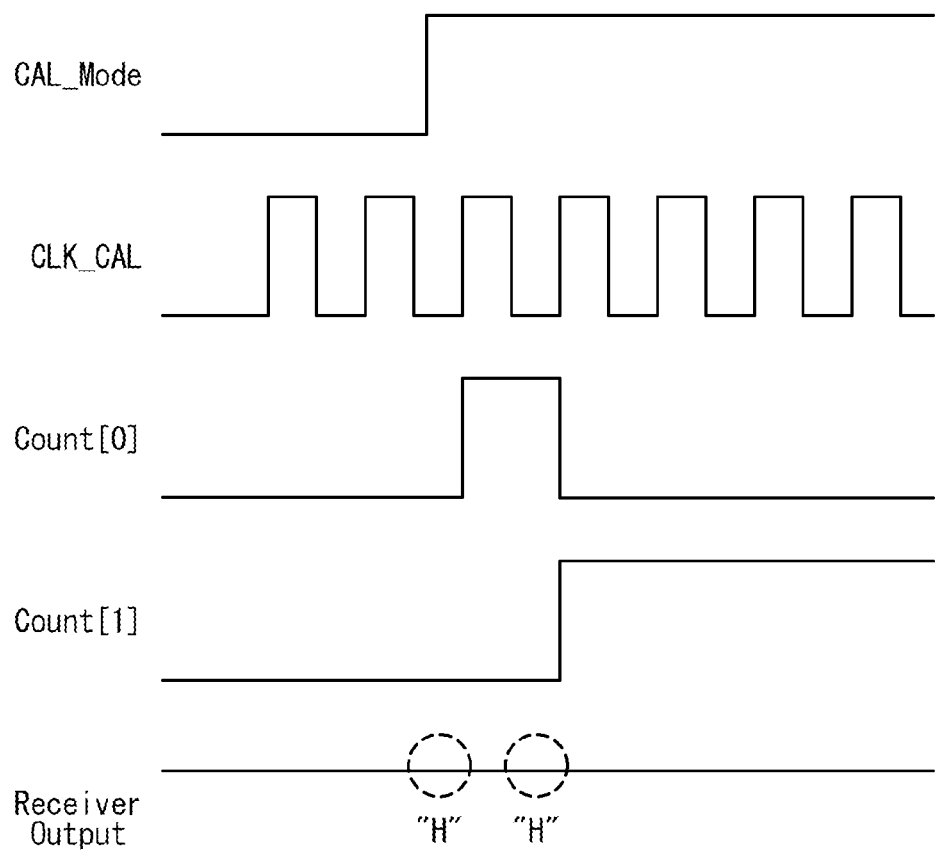

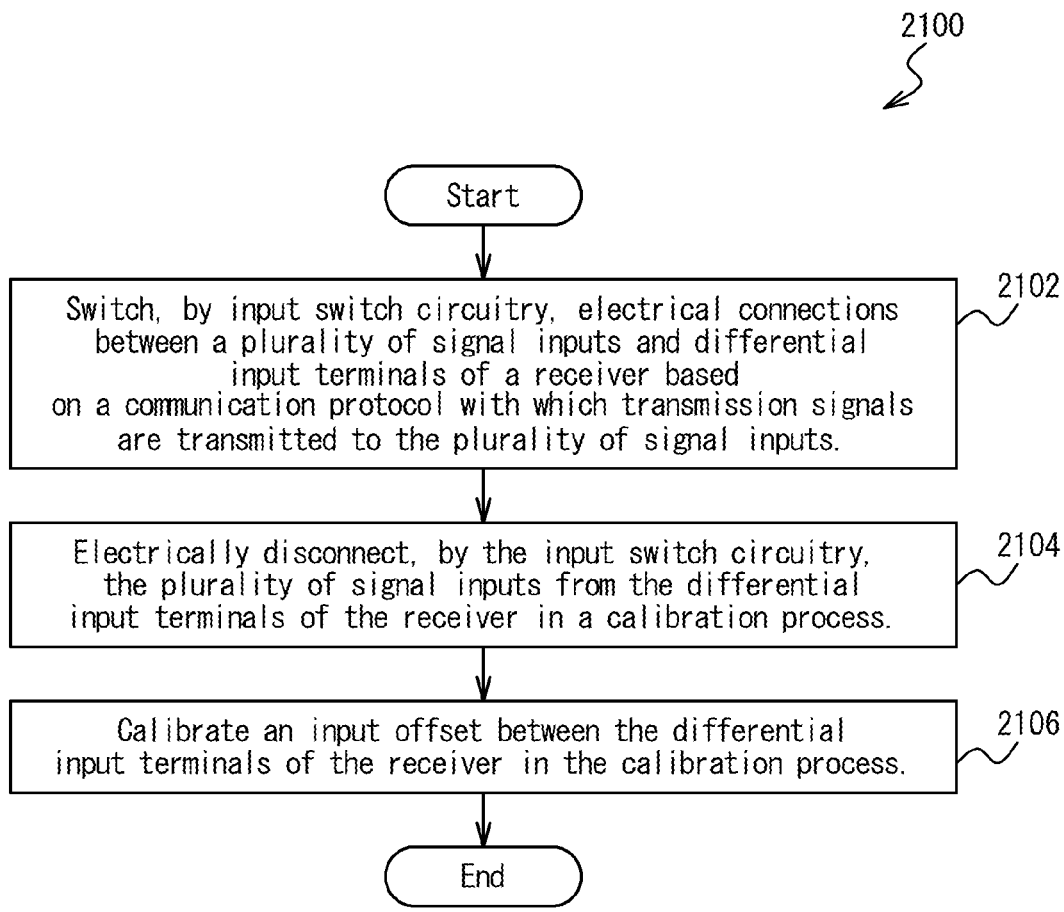

DEVICE AND METHOD FOR RECEIVER OFFSET CALIBRATION

FIELD

The disclosed technology relates generally to devices and methods for offset calibration of receivers adapted to differential signaling.

BACKGROUND

Differential signaling is widely used for high speed data transmission. A receiver adapted to differential signaling may be configured to receive a pair of differential input signals and identify data carried by the differential input signals based on the signal level difference between the differential input signals. One issue with the differential signaling may be an input offset of the receiver. The input offset of the receiver may cause unsuccessful data reception and/or reduce tolerance against noise, jitter, signal distortion or other undesirable effects.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, an integrated circuit is provided. The integrated circuit includes a plurality of signal inputs, a receiver, calibration circuitry, and input switch circuitry. The receiver includes differential input terminals. The calibration circuitry is configured to calibrate an input offset between the differential input terminals of the receiver in response to the integrated circuit being placed in a calibration mode. The input switch circuitry is configured to switch electrical connections between the plurality of signal inputs and the differential input terminals of the receiver in response to the integrated circuit being placed in a mode different from the calibration mode. The input switch circuitry is further configured to electrically disconnect the plurality of signal inputs from the differential input terminals of the receiver in response to the integrated circuit being placed in the calibration mode.

In one or more embodiments, a display driver is provided. The display driver includes interface circuitry and source driver circuitry. The interface circuitry includes a plurality of signal inputs, a receiver, calibration circuitry, and input switch circuitry. The receiver includes differential input terminals. The calibration circuitry is configured to calibrate an input offset of the differential input terminals of the receiver in response to the display driver being placed in a calibration mode. The input switch circuitry is configured to switch electrical connections between the plurality of signal inputs and the differential input terminals of the receiver in response to the display driver being placed in a mode different from the calibration mode. The input switch circuitry is further configured to electrically disconnect the plurality of signal inputs from the differential input terminals of the receiver in response to the display driver being placed in the calibration mode. The source driver circuitry is configured to update a display panel based on an output of the receiver.

In one or more embodiments, a method for input offset calibration for a receiver is provided. The method includes switching, by input switch circuitry, electrical connections between a plurality of signal inputs and differential input terminals of a receiver based on a communication protocol with which transmission signals are transmitted to the plurality of signal inputs. The method further includes electrically disconnecting, by the input switch circuitry, the plurality of signal inputs from the differential input terminals of the receiver in a calibration process. The method further includes calibrating an input offset between the differential input terminals of the receiver in the calibration process.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

FIG. 4 illustrates an example operation of the integrated circuit in a calibration mode, according to one or more embodiments.

FIG. 10C illustrates example configurations of a receiver and an offset generator, according to other embodiments.

FIG. 14 illustrates an example operation of an integrated circuit, according to one or more embodiments.

FIG. 21 illustrates an example method for operating an integrated circuit, according to one or more embodiments.

Figure 1:
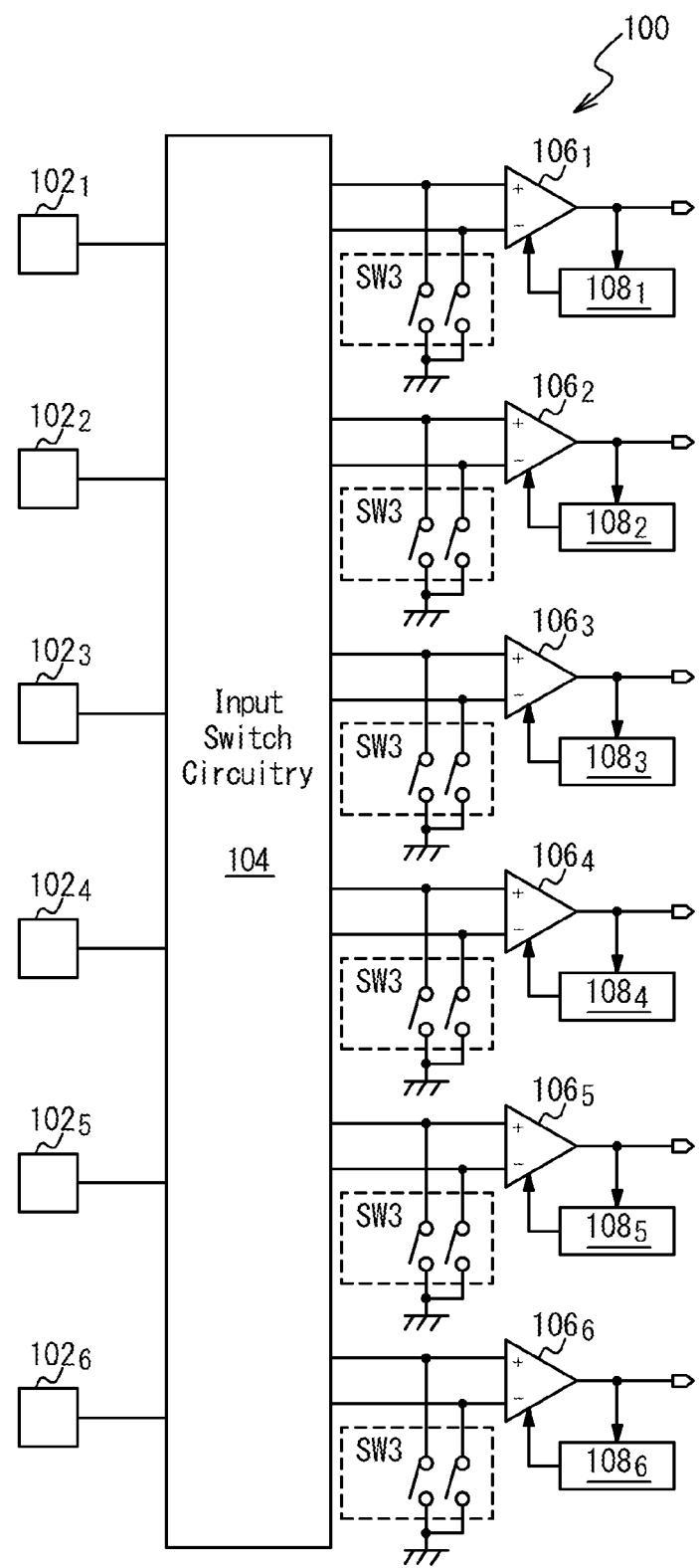
FIG. 1 illustrates an example configuration of an integrated circuit, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In the present application, the term "coupled" means connected directly to or connected through one or more intervening components or circuits.

Differential signaling, which transmits data in the form of the voltage difference between a pair of signals, is widely used for high speed data transmission. Examples of differential signaling include mobile industry processor interface (MIPI) D-PHY, MIPI C-PHY, and low voltage differential signaling (LVDS). An integrated circuit (ICs) adapted to differential signaling may include a receiver configured to receive a pair of differential input signals to identify data carried by the differential signals.

A receiver for differential signaling may suffer from an input offset which may result from manufacturing variations or other causes. For example, a difference in electrical characteristics (e.g., the threshold voltages and the channel conductivities) between input transistors that receive the differential signals in the differential input stage may cause an input offset of the receiver. Hereinafter, the input offset caused by inevitable causes (e.g., manufacturing variations) may be also referred to as intrinsic input offset. The intrinsic input offset of the receiver may undesirably cause a data error and/or reduce tolerance against noise, jitter, signal distortion or other undesirable effects. The effect of the input offset may be more significant in modern systems in which the voltage level difference between the differential input signals is very small (e.g., 100 mV or less) to reduce electromagnetic interference (EMI).

Meanwhile, an integrated circuit may be designed to be adapted to multiple differential signaling protocols. In some implementations, for example, an integrated circuitry may be adapted to both MIPI D-PHY and MIPI C-PHY. Adaption to multiple differential signaling protocols may effectively improve availability of the integrated circuitry.

The present disclosure presents devices and methods for input offset calibration which may be suitable for integrated circuits adapted to multiple data transmission protocols. In one or more embodiments, an integrated circuit includes a plurality of signal inputs, a receiver, calibration circuitry, and input switch circuitry. The receiver includes differential input terminals. The calibration circuitry is configured to calibrate an input offset between the differential input terminals of the receiver in response to the integrated circuit being placed in a calibration mode. The input switch circuitry is configured to switch electrical connections between the plurality of signal inputs and the differential input terminals of the receiver in response to the integrated circuit being placed in a mode different from the calibration mode. The input switch circuitry is further configured to electrically disconnect the plurality of signal inputs from the differential input terminals of the receiver in response to the integrated circuit being placed in the calibration mode.

FIG. 1 illustrates an example configuration of an integrated circuit 100, according to one or more embodiments. In the illustrated embodiment, the integrated circuit 100 includes a plurality of signal inputs $102_1$, $102_2$, $102_3$, $102_4$, $102_5$, $102_6$, input switch circuitry 104, short-circuit switch circuits SW3, a plurality of receivers $106_1$, $106_2$, $106_3$, $106_4$, $106_5$, $106_6$, and a plurality of calibration circuits $108_1$, $108_2$, $108_3$, $108_4$, $108_5$, and $108_6$. The signal inputs $102_1$ to $102_6$ may be hereinafter collectively referred to as signal inputs 102. Correspondingly, the receivers $106_1$ to $106_6$ may be referred to as receivers 106, and the calibration circuits $108_1$ to $108_6$ may be referred to as calibration circuits 108. While FIG. 1 illustrates six signal inputs $102_1$-$102_6$, six short-circuit switch circuits SW3, six receives 106, and six calibration circuits 108, those skilled in the art would appreciate that the numbers of the signal inputs 102, the short-circuit switch circuits SW3, the receives 106, and the calibration circuits 108 may be variously modified in accordance with the purposes and applications.

The signal inputs 102 are configured to receive transmission signals from an entity (e.g., a controller, a host, a central processing unit (CPU), an application processor or other processors) external to the integrated circuit 100. The signal inputs may include pads or other types of conductors. In embodiments where a surface mounting technology (SMT) is used to mount the integrated circuit 100 on a substrate (e.g., a display panel, a flexible printed circuit board, a flexible resin film, or other substrates), the signal inputs 102 may be surface mount pads coupled to bumps configured to be coupled to routing traces on the substrate. In other embodiments, the signal inputs 102 may be bonding pads coupled to bonding wires. The transmission signals supplied to the signal inputs 102 include a plurality of pairs of differential signals.

The input switch circuitry 104 is configured to switch electrical connections between the signal inputs 102 and the differential input terminals of the receivers 106. In various embodiments, the input switch circuitry 104 is configured to switch the electrical connections to provide different pairs of differential signals to different receivers 106 in accordance with the data transmission protocol used to provide the transmission signals to the integrated circuit 100. The input switch circuitry 104 may be configured to electrically connect selected two of the plurality of signal inputs 102 to the differential input terminals of a receiver 106 based on a communication protocol with which transmission signals are transmitted to the plurality of signal inputs 102. The input switch circuitry 104 may be configured to electrically connect a first combination of two of the signal inputs 102 to the differential input terminals of a receiver 106 to achieve data transmission in accordance with a first protocol. The input switch circuitry 104 may be further configured to electrically connect a second combination of two of the signal inputs 102 to the differential input terminals of the receiver 106 to achieve data transmission in accordance with a second protocol, where the second combination is different from the first combination. In one implementation, the first protocol may be the MIPI D-PHY protocol and the second protocol may be the MIPI C-PHY protocol.

The receivers 106 are each configured to receive a pair of differential signals on the differential input terminals and output a single-ended signal corresponding to data carried by the received pair of differential signals. One of the differential input terminals of each receiver 106 is a non-inverting input terminal indicated by "+" in FIG. 1, and the other is an inverting input terminal indicated by "−". In some embodiments, each receiver 106 is configured to set the output thereof to the high level ("H") in response to the voltage level on the non-inverting input terminal being higher than the voltage level on the inverting input terminal and set the output thereof to the low level ("L") in response to the voltage level on the non-inverting input terminal being lower than the voltage level on the inverting input terminal. In other embodiments where the single-ended signal is low active, each receiver 106 may be configured to set the output thereof to "L" in response to the voltage level on the non-inverting input terminal being higher than the voltage level on the inverting input terminal and set the output thereof to "H" in response to the voltage level on the non-inverting input terminal being lower than the voltage level on the inverting input terminal.

The short-circuit switch circuits SW3 are respectively coupled to the receivers 106 and configured to short-circuit the differential input terminals of the corresponding receivers 106. In one implementation, the short-circuit switch circuits SW3 are configured to short-circuit the differential input terminals of the corresponding receivers 106 to a ground voltage. In other embodiments, the short-circuit switch circuit SW3 may be configured to short-circuit the differential input terminals of the corresponding receivers 106 to a common-mode voltage that may be fixed. In the illustrated embodiment, each short-circuit switch circuit SW3 includes a pair of switch elements respectively coupled to the differential input terminals of the corresponding receiver 106, and the switch elements are configured to short-circuit the differential input terminals to the circuit ground.

The calibration circuits $108_1$ to $108_6$ are configured to calibrate the input offsets of the corresponding receivers $106_1$ to $106_6$, respectively. An ideal receiver 106, which has an intrinsic input offset of 0V, is configured to change or flip the output between "H" and "L" when the input voltage between the differential input terminals of the receiver 106 crosses 0V. However, due to manufacturing process or other causes, a real receiver 106 may change the output at an input voltage different from 0V. The input offset of a receiver 106 may refer to an input voltage at which the receiver 106 changes its output between "H" and "L". In various embodiments, the calibration circuits 108 are configured to calibrate the corresponding receivers 106 by generating and applying extrinsic input offsets to the differential input terminals of the corresponding receivers 106 to mitigate or cancel the intrinsic input offsets of the receivers 106.

In various embodiments, the calibration of the receivers 106 is performed in a calibration mode. The calibration circuits $108_1$ to $108_6$ may be configured to calibrate the corresponding receivers $106_1$ to $106_6$ in response to the integrated circuit 100 being placed in the calibration mode. In such embodiments, the input switch circuitry 104 may be configured to electrically disconnect the signal inputs 102 from the differential input terminals of the receivers 106 in response to the integrated circuit 100 being placed in the calibration mode, and the short-circuit switch circuits SW3 may be configured to short-circuit the differential input terminals of the receivers 106 to a ground voltage or a common-mode voltage in response to the integrated circuit 100 being placed in the calibration mode. The input switch circuitry 104 may be further configured to switch electrical connections between the signal inputs 102 and the differential input terminals of the receivers 106 in response to the integrated circuit 100 being placed in a mode different from the calibration mode.

Figure 2A:
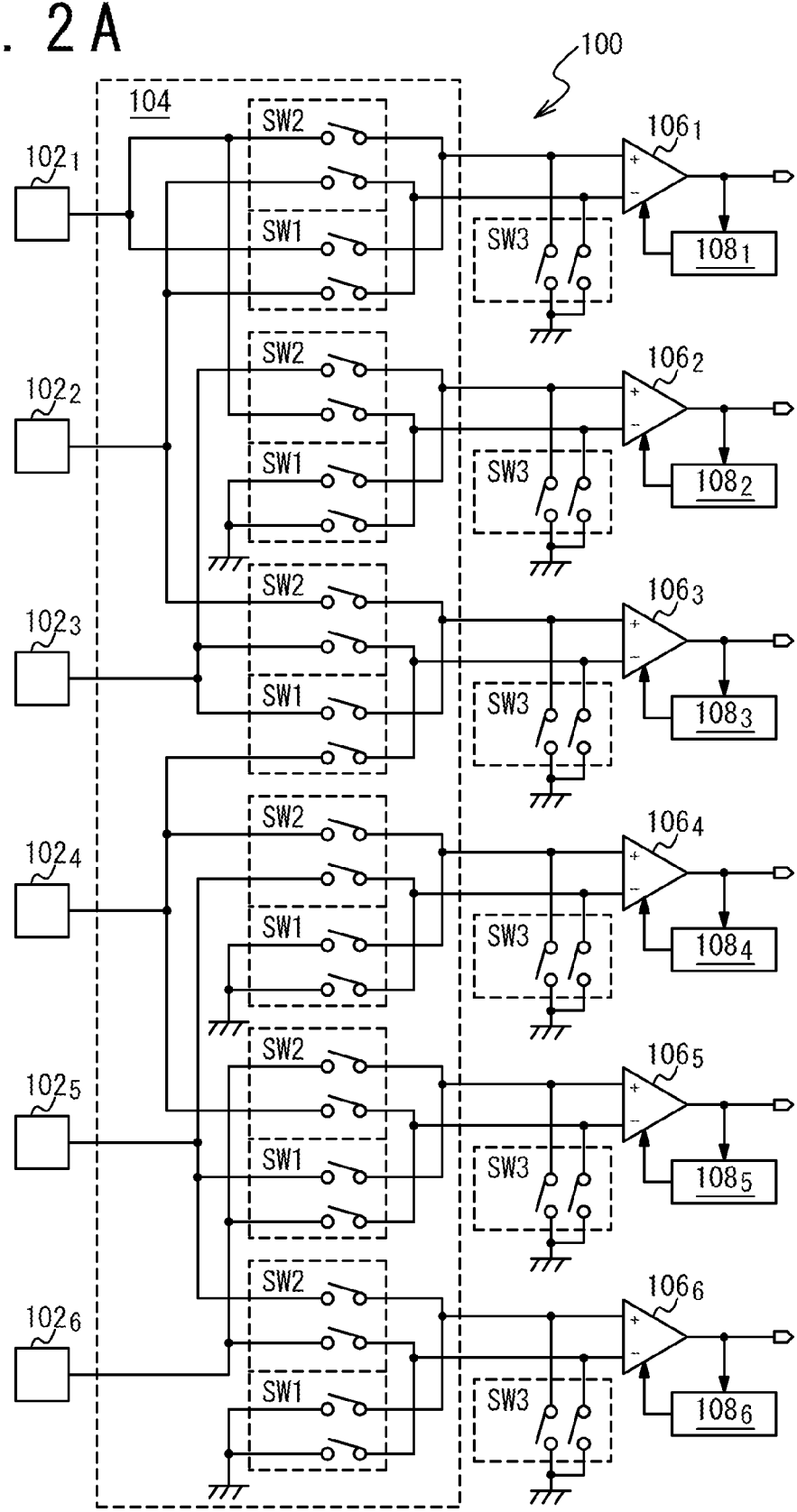
FIG. 2A illustrates an example detailed configuration of an integrated circuit, according to one or more embodiments.

FIG. 2A illustrates a detailed example configuration of the input switch circuitry 104, according to one or more embodiments. In the embodiment illustrated in FIG. 2A, the integrated circuit 100 is adapted to two data transmission protocols, MIPI D-PHY and MIPI C-PHY. The input switch circuitry 104 includes D-PHY switch circuits SW1 and C-PHY switch circuits SW2. Each D-PHY switch circuit SW1 may include a pair of switch elements coupled to the differential input terminals of the corresponding receiver 106. The D-PHY switch circuits SW1 are configured to be turned on when data transmission to the integrated circuit 100 is performed in accordance with the MIPI D-PHY protocol. Each C-PHY switch circuit SW2 may include a pair of switch elements coupled to the differential input terminals of the corresponding receiver 106. The C-PHY switch circuits SW2 are configured to be turned on when the data transmission is performed in accordance with the MIPI C-PHY protocol.

In the illustrated embodiment, the electrical connections in the input switch circuitry 104 are as follows. The non-inverting input terminal and the inverting input terminal of the receiver $106_1$ are coupled to the signal inputs $102_1$ and $102_2$, respectively, via the corresponding D-PHY switch circuit SW1 and further coupled to the signal inputs $102_1$ and $102_2$, respectively, via the corresponding C-PHY switch circuit SW2. The non-inverting input terminal and the inverting input terminal of the receiver $106_2$ are coupled to the circuit ground via the corresponding D-PHY switch circuit SW1 and further coupled to the signal inputs $102_3$ and $102_1$, respectively, via the corresponding C-PHY switch circuit SW2. The non-inverting input terminal and the inverting input terminal of the receiver $106_3$ are coupled to the signal inputs $102_3$ and $102_4$, respectively, via the corresponding D-PHY switch circuit SW1 and further coupled to the signal inputs $102_3$ and $102_1$, respectively, via the corresponding C-PHY switch circuits SW2. The non-inverting input terminal and the inverting input terminal of the receiver $106_4$ are coupled to the circuit ground via the corresponding D-PHY switch circuit SW1 and coupled to the signal inputs $102_4$ and $102_5$, respectively, via the corresponding C-PHY switch circuit SW2. The non-inverting input terminal and the inverting input terminal of the receiver $106_5$ are coupled to the signal inputs $102_5$ and $102_6$ via the corresponding D-PHY switch circuit SW1 and coupled to the signal inputs $102_6$ and $102_4$, respectively, via the corresponding C-PHY switch circuit SW2. The non-inverting input terminal and the inverting input terminal of the receiver $106_6$ are coupled to the circuit ground via the corresponding D-PHY switch circuit SW1 and coupled to the signal inputs $102_5$ and $102_6$, respectively, via the corresponding C-PHY switch circuit SW2.

Figure 2B:
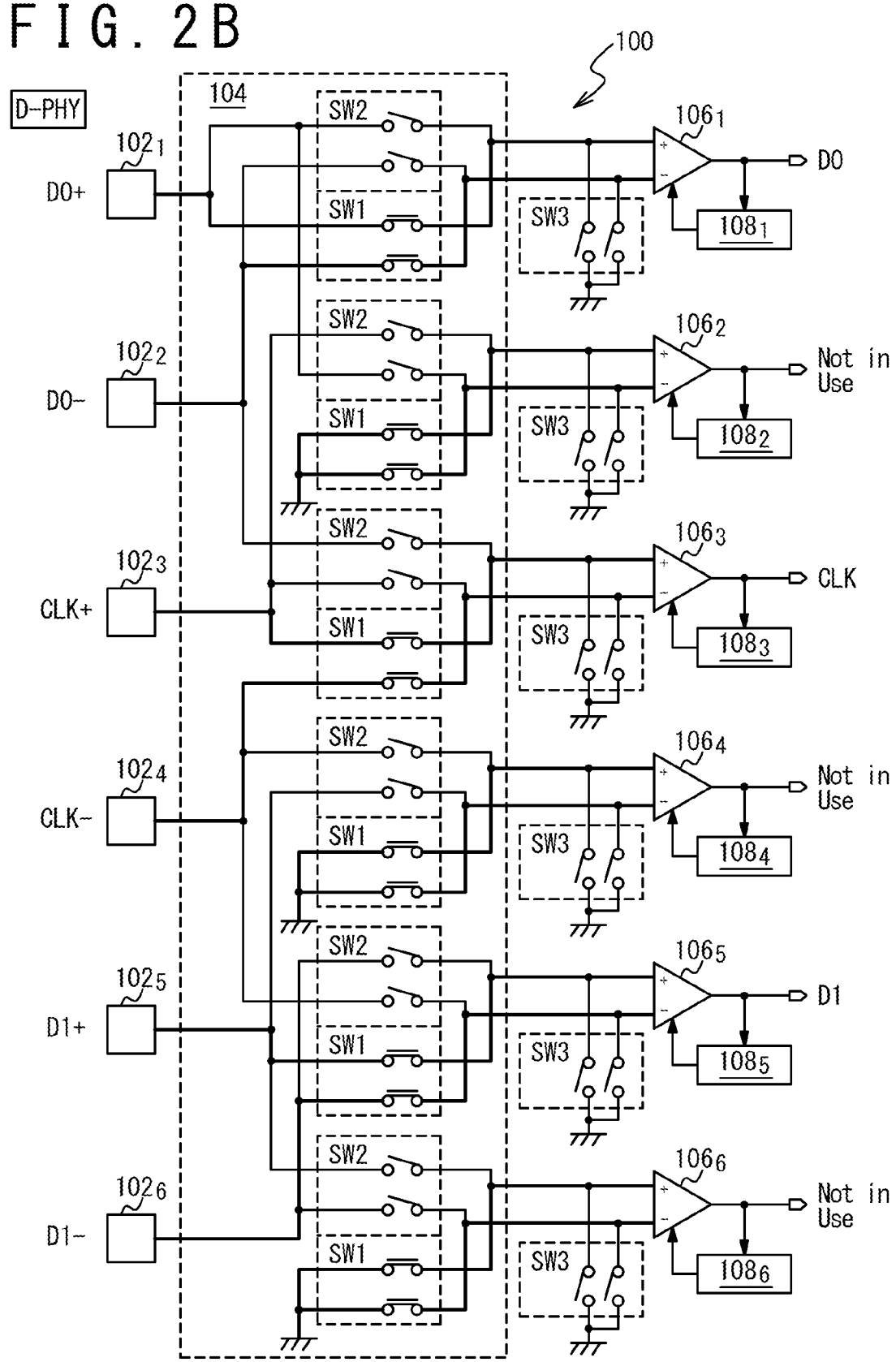
FIG. 2B illustrates an example operation of input switch circuitry of the integrated circuit illustrated in FIG. 2A, according to one or more embodiments.

FIG. 2B illustrates an example operation of the input switch circuitry 104 in a D-PHY mode, according to one or more embodiment, where the D-PHY mode is a mode in which D-PHY transmission signals are transmitted to the integrated circuit 100 in accordance with the MIPI D-PHY protocol. In the illustrated embodiment, the integrated circuit 100 receives a first pair of differential data signals D0+, D0−, a pair of differential clock signals CLK+ and CLK−, and a second pair of differential data signals D1+, D1− on the signal inputs $102_1$ to $102_6$ in the D-PHY mode.

In the D-PHY mode, the D-PHY switch circuits SW1 in the input switch circuitry 104 are turned on with the C-PHY switch circuits SW2 turned off. The receiver $106_1$ receives the pair of differential data signals D0+ and D0− from the signal inputs $102_1$ and $102_2$ via the corresponding D-PHY switch circuit SW1 and outputs a single-ended data signal D0 corresponding to the pair of differential signals D0+ and D0−. The receiver $106_2$ is not used in the D-PHY mode with the differential input terminals coupled to the circuit ground via the corresponding D-PHY switch circuit SW1. The receiver $106_3$ receives the pair of differential clock signals CLK+ and CLK− from the signal inputs $102_3$ and $102_4$ via the corresponding D-PHY switch circuit SW1 and outputs a single-ended clock signal CLK corresponding to the differential clock signals CLK+ and CLK−. The receiver $106_4$ is not used in the D-PHY mode with the differential input terminals coupled to the circuit ground via the corresponding D-PHY switch circuit SW1. The receiver $106_5$ receives the pair of differential data signals D1+ and D1− from the signal inputs $102_5$ and $102_6$ via the corresponding D-PHY switch circuit SW1 and outputs a single-ended data signal D1 corresponding to the pair of differential data signals D1+ and D1−. The receiver $106_6$ is not used in the D-PHY mode with the differential input terminals coupled to the circuit ground via the corresponding D-PHY switch circuit SW1. The single-ended clock signal CLK may be used to latch the single-ended data signals D1 and D2 in a following stage (not illustrated) coupled to the outputs of the receivers 106.

Figure 2C:
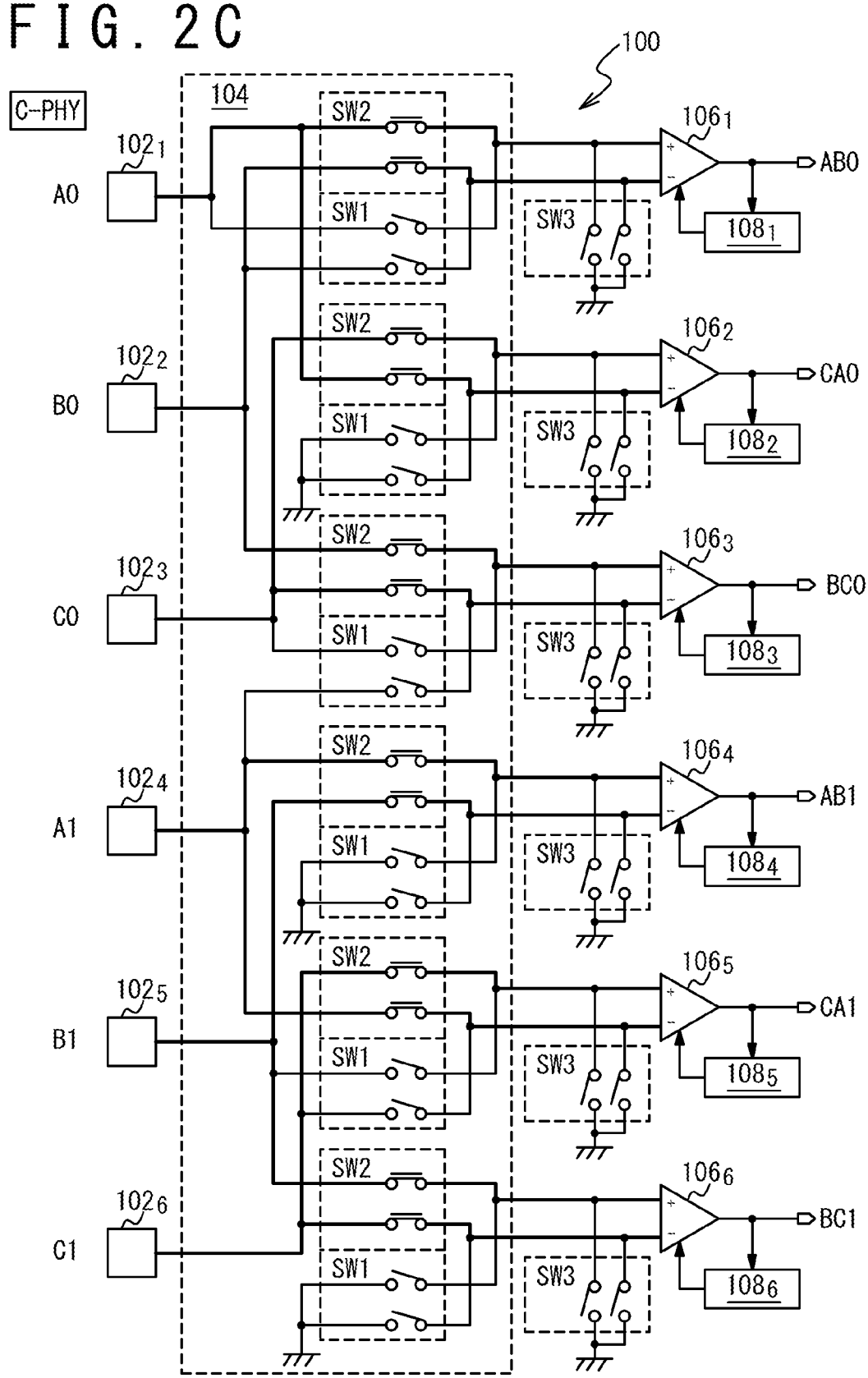
FIG. 2C illustrates an example operation of input switch circuitry of the integrated circuit illustrated in FIG. 2A, according to one or more embodiments

FIG. 2C illustrates an example operation of the input switch circuitry 104 in a C-PHY mode, according to one or more embodiments, where the C-PHY mode is a mode in which C-PHY transmission signals are transmitted to the integrated circuit 100 in accordance with the MIPI C-PHY protocol. In the illustrated embodiment, the integrated circuit 100 receives a first set of data signals A0, B0, and C0, and a second set of data signals A1, B1, and C1 on the signal inputs $102_1$ to $102_6$ in the C-PHY mode. Every combination of two of the data signals A0, B0, and C0 are used as a pair of differential signals in which data are encoded in the form of the voltage difference. Correspondingly, every combination of two of the data signals A1, B1, and C1 are used as a pair of differential signals in which data are encoded in the form of the voltage difference.

In the C-PHY mode, the C-PHY switch circuits SW2 in the input switch circuitry 104 are turned on with the D-PHY switch circuits SW1 turned off. The receiver $106_1$ receives the data signals A0 and B0 from the signal inputs $102_1$ and $102_2$, respectively, via the corresponding C-PHY switch circuit SW2 and outputs a single-ended data signal AB0 corresponding to the voltage difference between the data signals A0 and B0. The receiver $106_2$ receives data signals C0 and A0 from the signal inputs $102_3$ and $102_1$, respectively, via the corresponding C-PHY switch circuit SW2 and outputs a single-ended data signal CA0 corresponding to the voltage difference between the data signals C0 and A0. The receiver $106_3$ receives data signals B0 and C0 from the signal inputs $102_2$ and $102_3$, respectively, via the corresponding C-PHY switch circuit SW2 and outputs a single-ended data signal BC0 corresponding to the voltage difference between the data signals B0 and C0. The receiver $106_4$ receives the data signals A1 and B1 from the signal inputs $102_4$ and $102_5$, respectively, via the corresponding C-PHY switch circuit SW2 and outputs a single-ended data signal AB1 corresponding to the voltage difference between the data signals A1 and B1. The receiver $106_5$ receives data signals C1 and A1 from the signal inputs $102_6$ and $102_4$, respectively, via the corresponding C-PHY switch circuit SW2 and outputs a single-ended data signal CA1 corresponding to the voltage difference between the data signals C1 and A1. The receiver $106_6$ receives data signals B1 and C1 from the signal inputs $102_5$ and $102_6$, respectively, via the corresponding C-PHY switch circuit SW2 and outputs a single-ended data signal BC1 corresponding to the voltage difference between the data signals B1 and C1.

Figure 3:
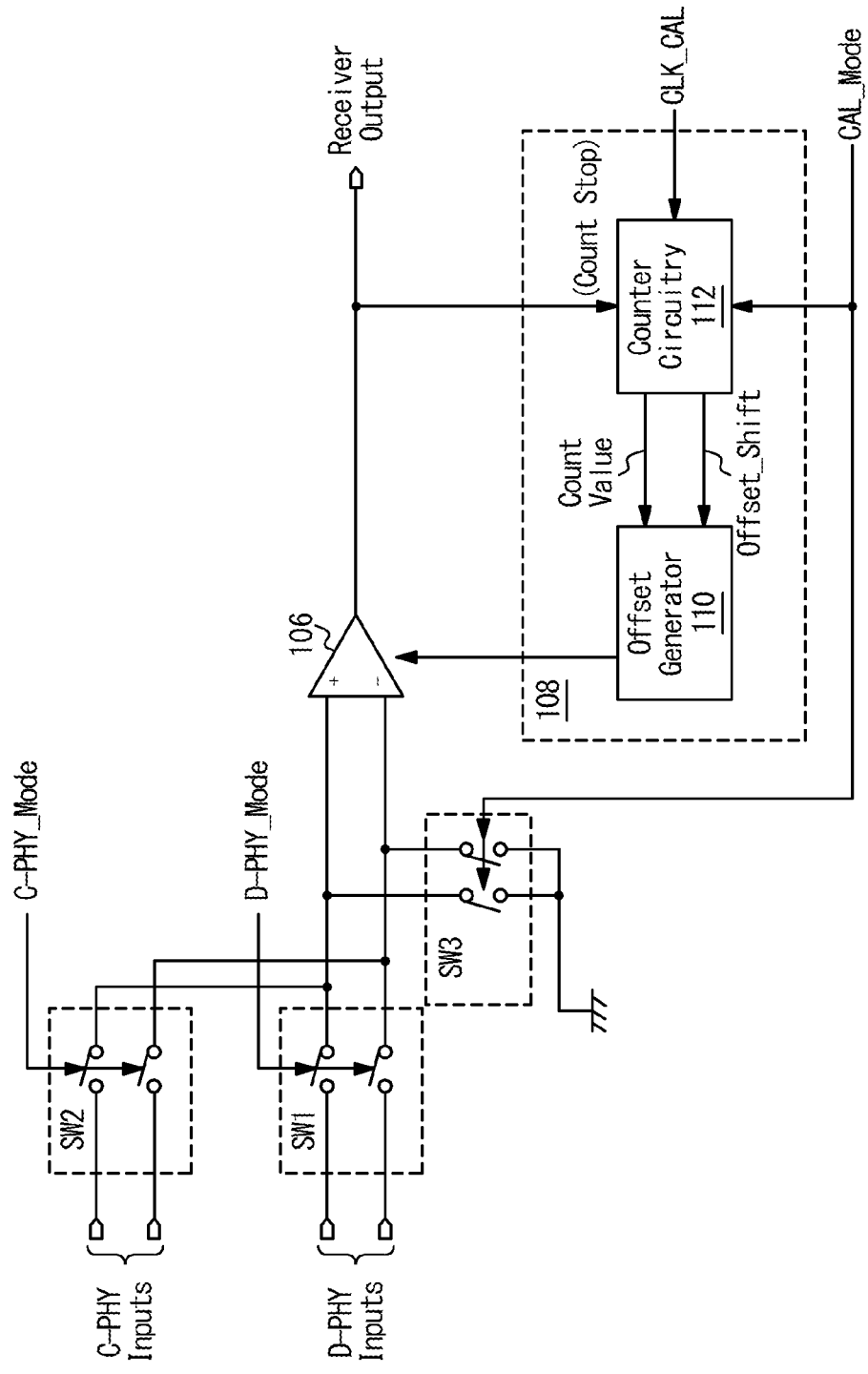
FIG. 3 illustrates an example partial configuration of the integrated circuit, according to one or more embodiment.

FIG. 3 illustrates an example partial configuration of the integrated circuit 100, according to one or more embodiment. Illustrated in FIG. 3 is a portion related to one receiver 106, which includes a D-PHY switch circuit SW1, a C-PHY switch circuit SW2, a short-circuit switch circuit SW3, and a calibration circuit 108. The D-PHY switch circuit SW1 is configured to provide electrical connections between the differential input terminals of the receiver 106 and two signal inputs 102 that receive a pair of D-PHY transmission signals in the D-PHY mode, and the C-PHY switch circuit SW2 is configured to provide electrical connections between the differential input terminals of the receiver 106 and two signal inputs 102 that receive a pair of C-PHY transmission signals in the C-PHY mode.

In one or more embodiments, the integrated circuit 100 is responsive to a D-PHY mode signal D-PHY_Mode, a C-PHY mode signal C-PHY_Mode. The D-PHY mode signal D-PHY_Mode is activated in the D-PHY mode, and the C-PHY mode signal C-PHY_Mode is activated in the C-PHY mode. The D-PHY switch circuit SW1 is configured to be turned on in response to an activation of the D-PHY mode signal D-PHY_Mode, and the C-PHY switch circuit SW2 is configured to be turned on in response to the C-PHY mode signal C-PHY_Mode.

The integrated circuit 100 is further responsive to a calibration mode signal CAL_Mode that is activated in the calibration mode. The calibration circuit 108 is configured to calibrate the receiver 106 in the calibration mode in response to an activation of the calibration mode signal CAL_Mode.

FIG. 4 illustrates one example operation of the integrated circuit 100 in the calibration mode, according to one or more embodiments. In the calibration mode, the calibration mode signal CAL_Mode is activated while the D-PHY mode signal D-PHY_Mode and the C-PHY mode signal C-PHY_Mode are deactivated. The D-PHY switch circuit SW1 and the C-PHY switch circuit SW2 are turned off to electrically disconnect the receiver 106 from the signal inputs 102 in response to the deactivations of the D-PHY mode signal D-PHY_Mode and the C-PHY mode signal C-PHY_Mode. Further, the short-circuit switch circuit SW3 is turned on to short-circuit the differential input terminals of the receiver 106 to the ground voltage in response to the activation of the calibration mode signal CAL_Mode.

In the calibration mode, the calibration circuit 108 calibrates the input offset of the receiver 106 in the state in which the differential input terminals of the receiver 106 are short-circuited by the short-circuit switch circuit SW3. In one implementation, the calibration process may include searching an optimum extrinsic input offset to be applied to the differential input terminals of the receiver 106 to mitigate or cancel the intrinsic input offset of the receiver 106 in the state in which the differential input terminals of the receiver 106 are short-circuited by the short-circuit switch circuit SW3. The searching of the optimum extrinsic input offset may include monitoring the output of the receiver 106 while changing the extrinsic input offset generated by the calibration circuit 108. The calibration circuit 108 may further determine, based on a change in the output of the receiver 106, the optimum extrinsic input offset to mitigate or cancel the intrinsic input offset of the receiver 106. When the receiver 106 is ideally manufactured and the intrinsic input offset of the receiver 106 is 0V, the output of the receiver 106 changes between the H and L when the extrinsic input offset crosses 0V. In this case, the optimum extrinsic input offset may be determined as 0V. When the intrinsic input offset of the receiver 106 is not 0V, the output of the receiver 106 changes when the extrinsic input offset crosses a voltage value that cancels the intrinsic input offset. The optimum extrinsic input offset may be determined based on the change in the output of the receiver 106 to at least partially cancel or mitigate the intrinsic input offset of the receiver 106.

In one or more embodiments, the calibration circuit 108 includes an offset generator 110 and counter circuitry 112. The offset generator 110 is configured to adjust the input offset of the receiver 106 by generating and applying an extrinsic input offset to the differential input terminals of the receiver 106 based on a count value received from the counter circuitry 112. The counter circuitry 112 is coupled to the output of the receiver 106 and configured to count the count value in synchronization with a calibration clock signal CLK_CAL which may be supplied from a clock generator (not illustrated). In some embodiments, the counter circuitry 112 may be configured to count up (or increment) the count value from zero to a predetermined value in synchronization with the calibration clock signal CLK_CAL. In other embodiments, the counter circuitry 112 may be configured to count down (or decrement) the count value from a predetermined value to zero in synchronization with the calibration clock signal CLK_CAL. The counter circuitry 112 may be configured to receive the calibration mode signal CAL_Mode and start counting in response to an activation of the calibration mode signal CAL_Mode. The counter circuitry 112 may be further configured to monitor the output of the receiver 106 and stop counting in response to a change in the output of the receiver 106.

Figure 5:
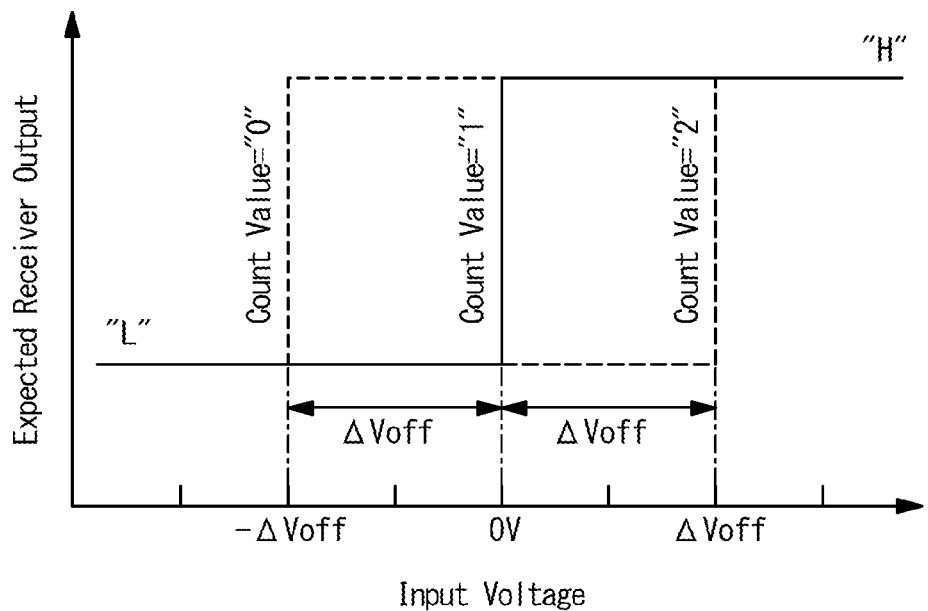
FIG. 5 illustrates an example set of predetermined extrinsic input offsets, according to one or more embodiments.

In various embodiments, the offset generator 110 may be configured to select one of predetermined extrinsic input offsets based on a count value received from the counter circuitry 112 and apply the selected extrinsic input offset to the differential input terminals of the receiver 106 to mitigate or cancel the intrinsic input offset. FIG. 5 illustrates an example set of predetermined extrinsic input offsets, according to one or more embodiments. In FIG. 5, the example predetermined extrinsic input offsets are illustrated in the form of the input voltages of the receiver 106 that cause the changes in the output of the receiver 106 for respective allowed count values of the counter circuitry 112. The input voltage referred herein is the voltage between the differential input terminals (e.g., the non-inverting input terminal and the inverting input terminal) of the receiver 106. The predetermined extrinsic input offsets may be defined in equal increments. In the illustrated embodiments, the allowed count values of the counter circuitry 112 are "0", "1", and "2", and the predetermined extrinsic input offsets for the count values of "0", "1", and "2" are defined as "−ΔVoff", "0V", and "ΔVoff", respectively, in equal increments of ΔVoff. For example, when the count value of the counter circuitry 112 is "0", the offset generator 110 selects the extrinsic input offset of "−ΔVoff" and applies the extrinsic input offset of "−ΔVoff" to the differential input terminals of the receiver 106. A similar goes for the count values "1" and "2."

Figure 6:
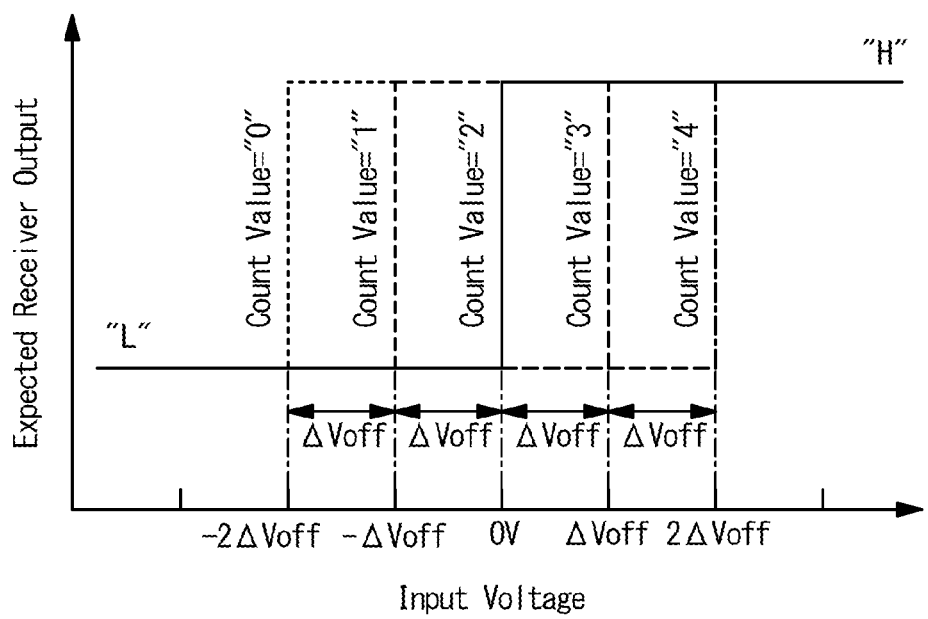
FIG. 6 illustrates another example set of predetermined extrinsic input offsets, according to one or more embodiments.

The number of the predetermined extrinsic input offsets may be modified, not limited to three. FIG. 6 illustrates another example set of predetermined extrinsic input offsets, according to one or more embodiments. In the illustrated embodiments, the allowed count values of the counter circuitry 112 are "0", "1", "2", "3", and "4", and the predetermined extrinsic input offsets for the count values of "0", "1", "2" "3", and "4" are "−Δ0Voff", "−ΔVoff", "0V", "ΔVoff", "Δ0Voff", respectively. It is noted that the predetermined extrinsic input offsets are also defined in equal increments in the embodiment illustrated in FIG. 6. Use of an increased number of redetermined extrinsic input offsets may allow finely adjusting the input offset of the receiver 106.

In one or more embodiments, the offset generator 110 may be configured to define a set of first extrinsic input offsets for the calibration mode and a set of second extrinsic input offsets for other operation modes, including the D-PHY mode and the C-PHY mode, where each of the second extrinsic input offsets is defined by shifting a corresponding one of the first extrinsic input offsets by a predetermined shift amount. The first extrinsic input offsets may be defined in equal increments, and the predetermined shift amount may be a half of the equal increments.

Figure 7A:
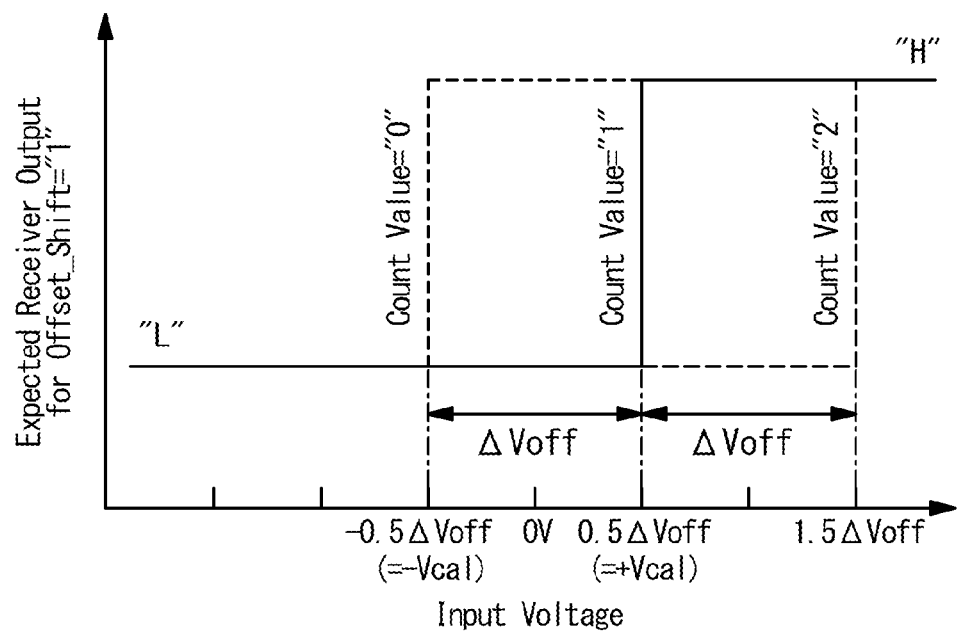
FIG. 7A illustrates an example definition of first extrinsic input offsets according to one or more embodiments.
Figure 7B:
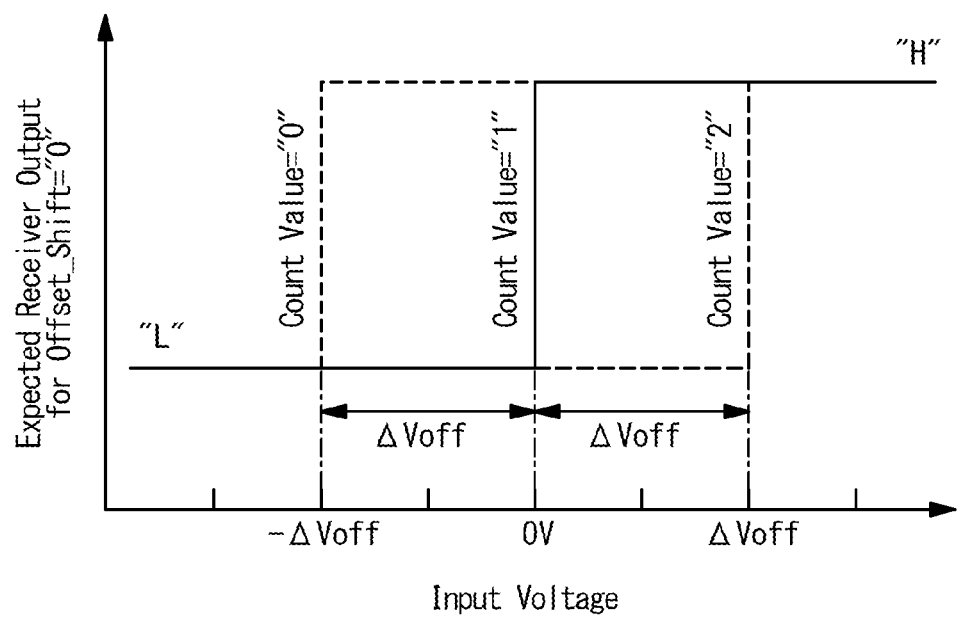
FIG. 7B illustrates an example definition of second extrinsic input offsets according to one or more embodiments.

FIG. 7A illustrates an example definition of the first extrinsic input offsets for the calibration mode and FIG. 7B illustrates an example definition of the second extrinsic input offsets for other operation modes, according to one or more embodiments. In the embodiment illustrated in FIG. 7A, the allowed count values of the counter circuitry 112 are "0", "1", and "2", and the first extrinsic input offsets may be defined as "−0.5ΔVoff", "0.5ΔVoff", and "1.5ΔVoff" for the count values of "0", "1", and "2", respectively, in equal increments of ΔVoff. It is noted that the first extrinsic input offsets for the count values of "0" and "1" may be hereinafter referred to as "−Vcal" and "+Vcal", respectively. As illustrated in FIG. 7B, the second extrinsic input offsets may be each defined by shifting the a corresponding one of the first extrinsic input offsets by a shift amount of 0.5ΔVoff. In the illustrated embodiment, the second extrinsic input offsets may be defined as "−ΔVoff", "0V", and "ΔVoff" for the count values of "0", "1", and "2", respectively.

The offset generator 110 may be configured to apply a selected one of the first extrinsic input offsets to the differential input terminals of the receiver 106 in the calibration mode while applying a selected one of the second extrinsic input offsets to the differential input terminals of the receiver 106 in other operation modes, including the D-PHY mode and the C-PHY mode. In one implementation, as illustrated in FIG. 3, the offset generator 110 may be configured to receive an offset shift signal Offset_Shift from the counter circuitry 112 and switch between the first extrinsic input offsets and the second extrinsic input offsets based on the offset shift signal Offset_Shift. In one implementation, the counter circuitry 112 may be configured to generate the offset shift signal Offset_Shift based on whether the integrated circuit 100 is placed in the calibration mode. The counter circuitry 112 may be configured to set the offset shift signal Offset_Shift to "1" in response to the integrated circuit 100 being placed in the calibration mode (e.g., in response to an activation of the calibration mode signal CAL_Mode), and the offset generator 110 may be configured to apply a selected one of the first extrinsic input offsets to the differential input terminals of the receiver 106 in response to the offset shift signal Offset_Shift being set to "1." The counter circuitry 112 may be configured to set the offset shift signal Offset_Shift to "0" in response to the integrated circuit 100 being placed in other operation modes (e.g., in response to a deactivation of the calibration mode signal CAL_Mode), and the offset generator 110 may be configured to apply a selected one of the second extrinsic input offsets to the differential input terminals of the receiver 106 in response to the offset shift signal Offset_Shift being set to "0."

In one implementation, the offset generator 110 and the counter circuitry 112 may be configured to determine an optimum count value of the counter circuitry 112 in the calibration mode and adjust the input offset of the receiver 106 by applying one of the second set of extrinsic input offset corresponding to the optimum count value in other operation modes, including the D-PHY mode and the C-PHY mode. The offset generator 110 may be configured to sequentially select the first extrinsic input offsets in response to the count value of the counter circuitry 112 being counted up or down in the calibration mode and sequentially apply the selected first extrinsic offsets to the differential input terminals of the receiver 106. The counter circuitry 112 may be configured to stop counting the count value in response to a change in the output of the receiver 106 and determine the optimum count value as the count value held by the counter circuitry 112 at the stopping of the counting. The offset generator 110 may be configured to adjust the input offset between the differential input terminals of the receiver 106 in the D-PHY mode and the C-PHY mode by selecting one of the second set of extrinsic input offsets based on the optimum count value received from the counter circuitry 112 and applying the selected one of the second extrinsic input offsets to the differential input terminals of the receiver 106.

Figure 8:
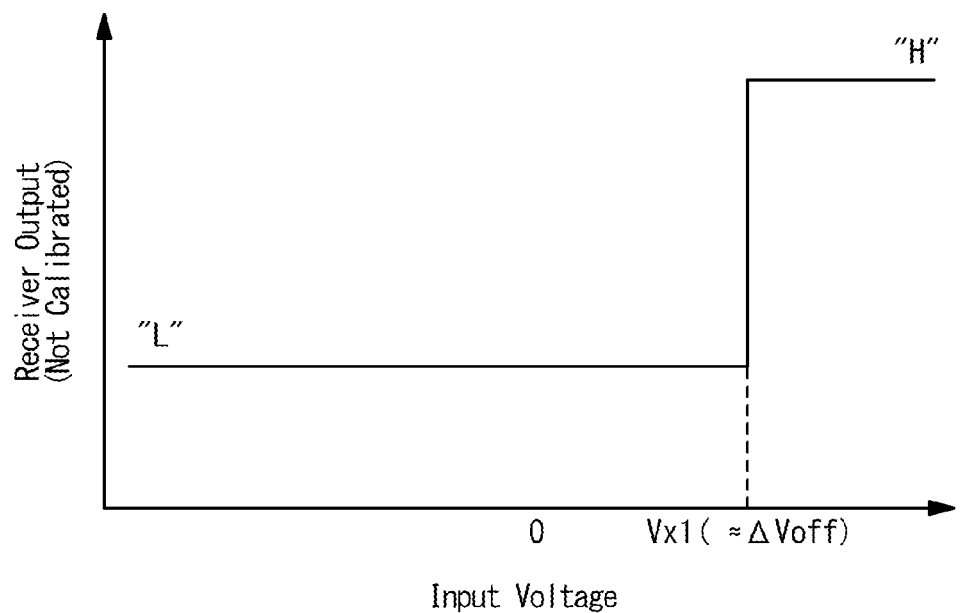
FIG. 8 illustrates an example input-output property of a receiver before calibration, according to one or more embodiments.
Figure 9:
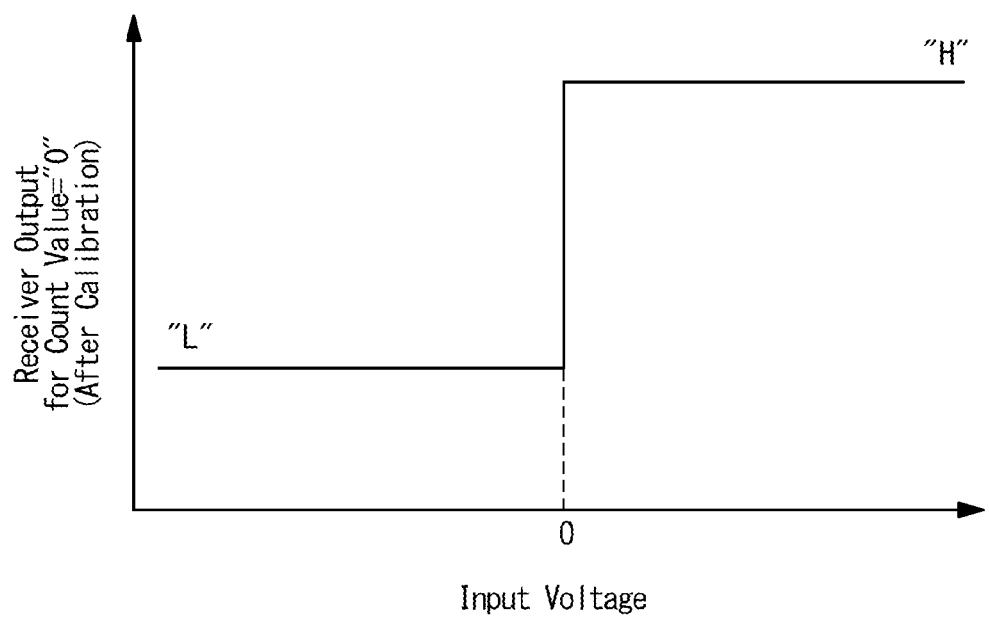
FIG. 9 illustrates an example input-output property of the receiver after calibration, according to one or more embodiments.

FIG. 8 and FIG. 9 illustrate an example calibration process of the input offset of the receiver 106, according to one or more embodiments. In the embodiment illustrated in FIG. 8, which illustrates an example input-output property of the receiver 106 before the calibration, the receiver 106 exhibits an intrinsic input offset of Vx1 that is close to ΔVoff. In other words, the receiver 106 is configured to change the output thereof at an input voltage equal to Vx1 before the calibration. In this case, as illustrated in FIG. 9, the input offset of the receiver 106 can be brought closer to 0V by setting the counter value to "0".

Figure 10A:
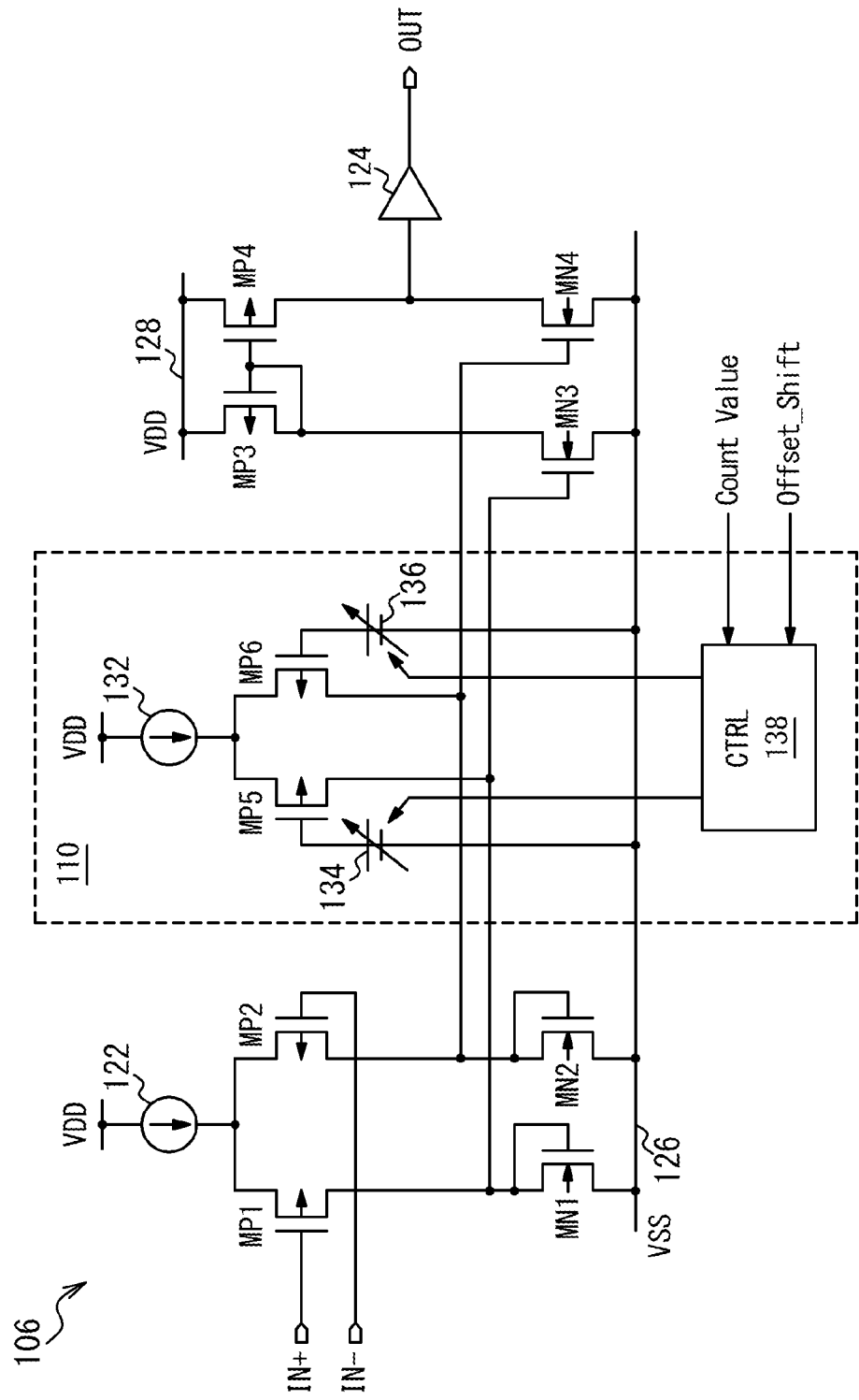
FIG. 10A illustrates example configurations of a receiver and an offset generator, according to one or more embodiments.

FIG. 10A illustrates example configurations of the receiver 106 and the offset generator 110, according to one or more embodiments. In the illustrated embodiment, the receiver 106 includes positive-channel metal oxide semiconductor (PMOS) transistors MP1, MP2, MP3, MP4, negative-channel metal oxide semiconductor (NMOS) transistors MN1, MN2, MN3, MN4, a constant current source 122, and a buffer 124.

The PMOS transistors MP1, MP2, the NMOS transistors MN1, MN2, and the constant current source 122 are collectively configured as a differential input stage that receives a pair of differential input signals on the non-inverting input terminal IN+ and the inverting input terminal IN−. The gate of the PMOS transistors MP1 is coupled the non-inverting input terminal IN+ and the gate of the PMOS transistors MP2 is coupled to the inverting input terminal IN−. The sources of the PMOS transistors MP1 and MP2 are commonly-coupled to the constant current source 122. The constant current source 122 is configured to supply a constant current to the commonly-coupled sources of the PMOS transistors MP1 and MP2. The NMOS transistors MN1 and MN2 are diode-connected. The drain and gate of the NMOS transistor MN1 is coupled to the drain of the PMOS transistor MP1 and the source of the NMOS transistor MN1 is coupled to a low-side power supply line 126 on which a low-side power supply voltage VSS is generated. In one implementation, the low-side power supply voltage VSS may be the ground voltage. The drain and gate of the NMOS transistor MN2 is coupled to the drain of the PMOS transistor MP2 and the source of the NMOS transistor MN2 is coupled to the low-side power supply line 126.

The PMOS transistors MP3, MP4, the NMOS transistors MN3, and MN4 are collectively configured as an active load configured to generate a voltage corresponding to the voltage difference between the differential input signals provided to the non-inverting input terminal IN+ and the inverting input terminal IN−. The PMOS transistors MP3 and MP4 are collectively configured as a current mirror. The sources of the PMOS transistors MP3 and MP4 are commonly coupled to a high-side power supply line 128 on which a high-side power supply voltage VDD is generated, where the high-side power supply voltage VDD is higher than the low-side power supply voltage VSS. The gates of the PMOS transistors MP3 and MP4 are commonly coupled to the drain of the PMOS transistor MP3. The drain of the NMOS transistor MN3 is coupled to the drain of the PMOS transistor MP3, and the gate of the NMOS transistor MN3 is coupled to the drain of the diode-connected NMOS transistor MN1. The drain of the NMOS transistor MN4 is coupled to the drain of the PMOS transistor MP4, and the gate of the NMOS transistor MN4 is coupled to the drain of the diode-connected NMOS transistor MN2. The sources of the NMOS transistors MN3 and MN4 are commonly coupled to the low-side power supply line 126.

The buffer 124 is configured to generate a single-ended signal corresponding to the differential input signals in response to the voltage generated on the drain of the NMOS transistor MN4. The buffer 124 may include a complementary metal-oxide-semiconductor (CMOS) buffer.

The receiver 106 thus configured may suffer from an intrinsic input offset due to manufacturing process. For example, the difference in the electrical characteristics (e.g., the threshold voltages and the channel conductivities) between the PMOS transistors MP1 and MP2 may cause an intrinsic input offset. To mitigate or eliminate the effect of the intrinsic input offset, the offset generator 110 is configured to generate and apply an extrinsic input offset to the differential inputs of the receiver 106 to cancel the intrinsic input offset.

In the illustrated embodiment, the offset generator 110 include PMOS transistors MP5, MP6, a constant current source 132, variable voltage generators 134, 136, and a controller 138. The sources of the PMOS transistors MP5 and MP6 are commonly coupled to the constant current source 132, which is configured to supply a constant current to the sources of the PMOS transistors MP5 and MP6. The drain of the PMOS transistor MP5 is coupled to the drain of the diode-connected NMOS transistor MN1 and the gate of the NMOS transistor MN3, and the drain of the PMOS transistor MP6 is coupled to the drain of the diode-connected NMOS transistor MN2 and the gate of the NMOS transistor MN4. The variable voltage generator 134 is configured to apply a first variable gate voltage to the gate of the PMOS transistor MP5, and the variable voltage generator 136 is configured to apply a second variable gate voltage to the gate of the PMOS transistor MP6. The controller 138 is configured to control the first and second gate voltages applied to the gates of the PMOS transistors MP5 and MP6 based on the count value and the offset shift signal Offset_Shift which are received from the counter circuitry 112 (illustrated in FIG. 3).

The offset generator 110 of FIG. 10A is configured to control the currents travelling through the diode-connected NMOS transistors MN1 and MN2 by controlling the first and second variable gate voltages applied to the PMOS transistors MP5 and MP6. The control of the currents through the diode-connected NMOS transistors MN1 and MN2 generates and applies an extrinsic input offset to the differential input terminals of the receiver 106 as indicated by the count value and the offset shift signal Offset_Shift received from the counter circuitry 112.

Figure 10B:
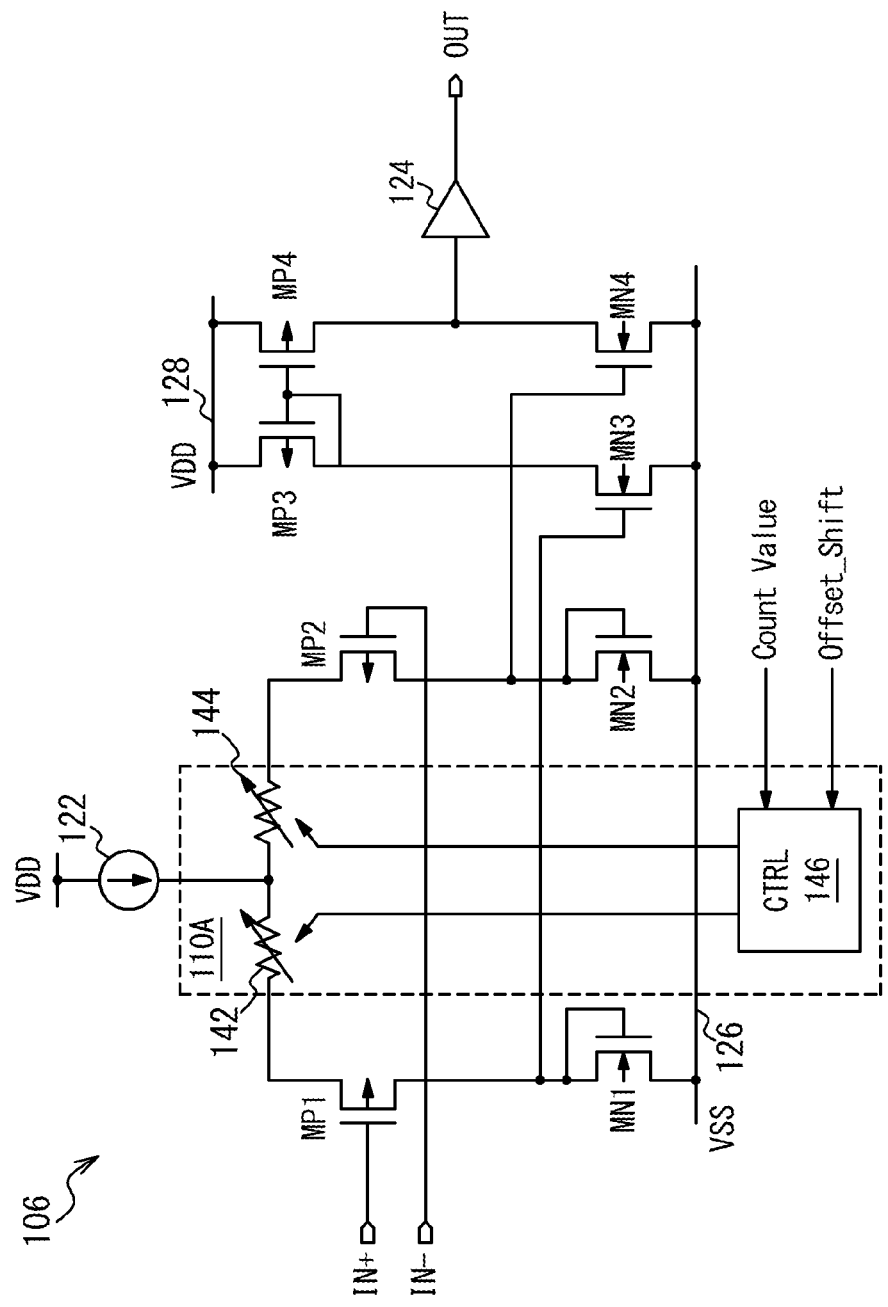
FIG. 10B illustrates an example configuration of an offset generator, according to other embodiments.

FIG. 10B illustrates another example configuration of the offset generator, denoted by numeral 110A, according to one or more embodiments. In the illustrated embodiment, the offset generator 110A includes a pair of variable resistors 142, 144, and a controller 146. The variable resistor 142 is coupled between the source of the PMOS transistor MP1 and the constant current source 122, and the variable resistor 144 is coupled between the source of the PMOS transistor MP2 and the constant current source 122. The controller 146 is configured to control the resistances of the variable resistors 142 and 144 based on the count value and the offset shift signal which are received from the counter circuitry 112 (illustrated in FIG. 3).

The offset generator 110A of FIG. 10B is configured to control the currents travelling through the diode-connected NMOS transistors MN1 and MN2 by controlling the resistances of the variable resistors 142 and 144. The control of the currents through the diode-connected NMOS transistors MN1 and MN2 generates and applies an extrinsic input offset to the differential input terminals of the receiver 106 as indicated by the count value and the offset shift signal Offset_Shift.

FIG. 10C illustrates other example configurations of the receiver, denoted by numeral 106B, and the offset generator, denoted by numeral 110B, according to other embodiments. The receiver 106B is configured as a sampling latch that operates in synchronization with a clock signal CLK. In the illustrated embodiment, the receiver 106B includes PMOS transistors MP11, MP12, MP13, MP14, MP15, NMOS transistors MN11, MN12, MN13, MN14, MN15, and MN16.

The PMOS transistor MP11, the NMOS transistors MN11, MN12, MN15, and MN16 are configured to activate the operation of the receiver 106B in synchronization with the clock signal CLK. The PMOS transistor MP11 has a gate supplied with the clock signal CLK and a source coupled to a high-side power supply line 152 on which the high-side power supply voltage VDD is generated. The PMOS transistor MP11 is configured to supply the high-side power supply voltage VDD to the commonly-connected sources of the PMOS transistors MP12 and MP13 in response to a pull-down of the clock signal CLK. The NMOS transistor MN11 has a gate supplied with the clock signal CLK, a drain coupled to the drain of the PMOS transistor MP12, and a source coupled to a low-side power supply line 154 on which the low-side power supply voltage VSS is generated. The NMOS transistor MN12 has a gate supplied with the clock signal CLK, a drain coupled to the drains of the PMOS transistor MP14 and the NMOS transistor MN13, and a source coupled to the low-side power supply line 154. The NMOS transistor MN15 has a gate supplied with the clock signal CLK, a drain coupled to the drains of the PMOS transistor MP15 and the NMOS transistor MN14, and a source coupled to the low-side power supply line 154. The NMOS transistor MN16 has a gate supplied with the clock signal CLK, a drain coupled to the drain of the PMOS transistor MP13, and a source coupled to the low-side power supply line 154.

The PMOS transistors MP12, MP13, MP14, MP15, the NMOS transistors MN13 and MN14 are collectively configured to generate a pair of output signals on the output terminals OUT+ and OUT− in response to the differential input signals supplied to the non-inverting input terminal IN+ and the inverting input terminal IN−. The PMOS transistor MP12 has a gate coupled to the non-inverting input terminal IN+ and the PMOS transistor MP13 has a gate coupled to the inverting input terminal IN−. The sources of the PMOS transistors MP12 and MP13 are commonly coupled to the drain of the PMOS transistor MP11. The PMOS transistors MP14, MP15 and the NMOS transistors MN13 and MN14 are collectively configured as cross-coupled inverters. The PMOS transistor MP14 has a source coupled to the drain of the PMOS transistor MP12 and a drain coupled to the drain of the NMOS transistor MN13. The PMOS transistor MP15 has a source coupled to the drain of the PMOS transistor MP13 and a drain coupled to the drain of the NMOS transistor MN14. The sources of the NMOS transistors MN13 and MN14 are commonly coupled to the low-side power supply line 154. The gates of the PMOS transistor MP14 and the NMOS transistor MN13 are commonly coupled to the drains of the PMOS transistor MP15 and the NMOS transistor MN14. The gates of the PMOS transistor MP15 and the NMOS transistor MN14 are commonly coupled to the drains of the PMOS transistor MP14 and the NMOS transistor MN13. The drains of the PMOS transistor MP14 and the NMOS transistor MN13 are commonly coupled to an output terminal OUT− and the drains of the PMOS transistor MP15 and the NMOS transistor MN14 are commonly coupled to an output terminal OUT+. The output signals are generated on the output terminals OUT+ and OUT−. In one implementation, the output terminals OUT+ and OUT− may be coupled to an output buffer (not illustrated) configured to generate a single-ended signal corresponding to the differential input signals supplied to the non-inverting input terminal IN+ and the inverting input terminal IN−.

In the embodiment illustrated in FIG. 10C, the offset generator 110B includes variable capacitors 156 and 158 and a controller 160. The variable capacitor 156 is coupled between the drain of the PMOS transistor MP12 and the low-side power supply line 154 and the variable capacitor 158 is coupled between the drain of the PMOS transistor MP13 and the low-side power supply line 154. The controller 160 is configured to control the capacitances of the variable capacitors 156 and 158 based on the count value and the offset shift signal Offset_Shift which are received from the counter circuitry 112 (illustrated in FIG. 3). The offset generator 110B of FIG. 10C is configured to control the capacitances of the variable capacitors 156 and 158 and thereby generate and applies an extrinsic input offset to the differential input terminals of the receiver 106B as indicated by the count value and the offset shift signal Offset_Shift received from the counter circuitry 112.

Figure 11:
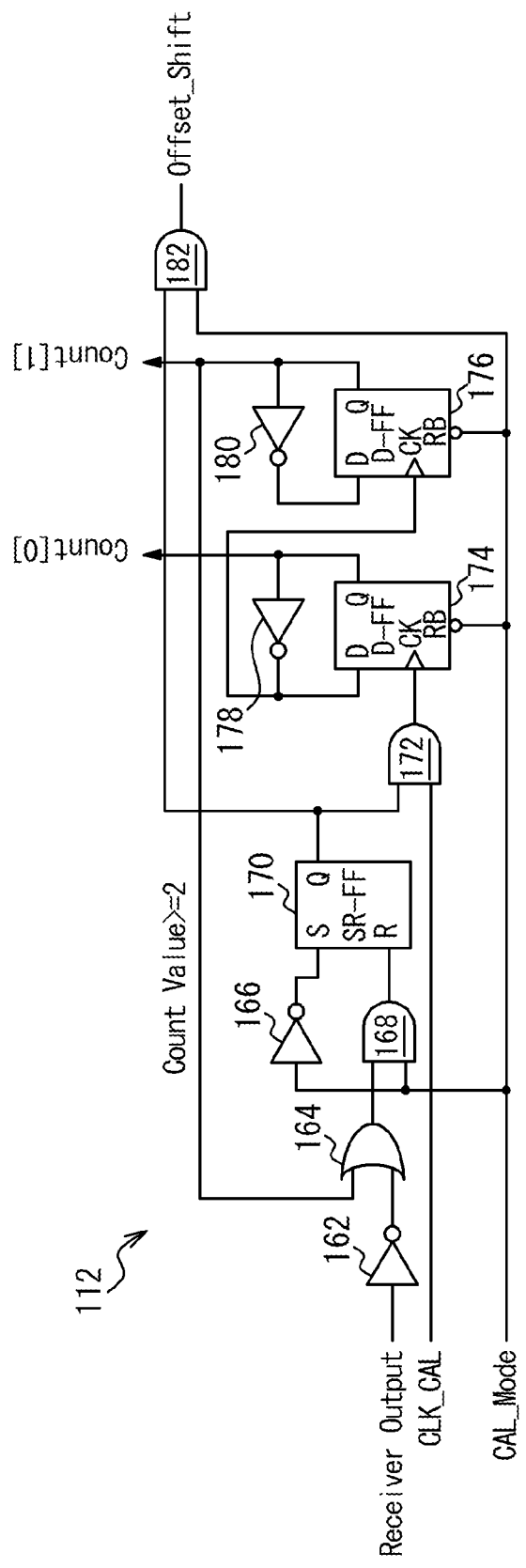
FIG. 11 illustrates an example configuration of counter circuitry, according to one or more embodiments.

FIG. 11 illustrates an example configuration of the counter circuitry 112, according to one or more embodiments. In the illustrated embodiment, the counter circuitry 112 is configured as a two-bit counter that includes an inverter 162, an OR gate 164, an inverter 166, an AND gate 168, an SR flipflop 170, an AND gate 172, D-flipflops 174, 176, inverters 178, 180, and an AND gate 182.

The inverter 162, the OR gate 164, the inverter 166, the AND gate 168, the SR flipflop 170, the AND gate 172 are collectively configured as gating circuitry that provides gating of the calibration clock signal CLK_CAL based on the output of the receiver 106, the calibration mode signal CAL_Mode, and the count value held by the counter circuitry 112. The inverter 162 is configured to receive the output of the receiver 106. The OR gate 164 has a first input coupled to the output of the inverter 162 and a second input coupled to the data output Q of the D-flipflop 176. It is noted that the data output Q of the D-flipflop 176 is set "H" when the count value held by the counter circuitry 112 is higher or equal to "2". The inverter 166 has an input that receives the calibration mode signal CAL_Mode and an output coupled to the set input S of the SR flipflop 170. The AND gate 168 has a first input coupled to the output of the OR gate 164, a second input that receives the calibration mode signal CAL_Mode, and an output coupled to the reset input R of the SR flipflop 170. The data output Q of the SR flipflop 170 is coupled to a first input of the AND gate 172 and also to a first input of the AND gate 182. The AND gate 172 is configured to provide gating of the calibration clock signal CLK_CAL. The AND gate 172 is configured to supply the calibration clock signal CLK_CAL to the D-flipflop 174 in response to the data output Q of the SR flipflop 170 being set "H".

The D-flipflops 174, 176 and the inverters 178 and 180 are collectively configured to perform a two-bit counter operation in synchronization with the calibration clock signal CLK_CAL received through the AND gate 172. The D flipflop 174 has a clock input CK coupled to the output of the AND gate 172, a data output Q coupled to the input of the inverter 178, and a data input D coupled to the output of the inverter 178. The D flipflop 176 has a clock input CK coupled to the output of the inverter 178, a data output Q coupled to the input of the inverter 180, and a data input D coupled to the output of the inverter 180. The data output Q of the D-flipflop 174 is used as the lower bit of the two-bit count value (indicated by "count [0]" in FIG. 11), and the data output Q of the D-flipflop 176 is used as the higher bit of the two-bit count value (indicated by "count [1]" in FIG. 11). The D-flipflops 174 and 176 further have reset inputs RB configured to receive the calibration mode signal CAL_Mode.

The AND gate 182 has a first input coupled to the data output Q of the SR flipflop 170, a second input that receives the calibration mode signal CAL_Mode. The output signal of the AND gate 182 is used as the offset shift signal Offset_Shift.

The counter circuitry 112 of FIG. 11 is configured to start counting in response to the calibration mode signal CAL_Mode being set "H" (or activated) and stop the counting in response to a change in the output of the receiver 106 from "H" to "L" and also in response to the count value reaching "2". More specifically, when the integrated circuit 100 is not placed in the calibration mode, the D-flipflops 174 and 176 are reset in response to the calibration mode signal CAL_Mode being set "L" (or deactivated) to reset the count value to "0". Meanwhile, the SR flipflop 170 is set in response to the calibration mode signal CAL_Mode being set "L" to allow supplying the calibration clock signal CLK_CAL to the D-flipflop 174. When the calibration mode signal CAL_Mode is then set "H" (or activated) to place the integrated circuit 100 into the calibration mode, the counter circuitry 112 starts counting the count value in response to the reset inputs of the D-flipflops 174 and 176 being set "H". The counter circuitry 112 continues to count the count value until the SR flipflop 170 is reset in response to the output of the receiver 106 being set "L" or the count value reaching "2". It is noted that the reset of the SR flipflop 170 stops supplying the calibration clock signal CLK_CAL to the D-flipflop 174.

Figure 12:
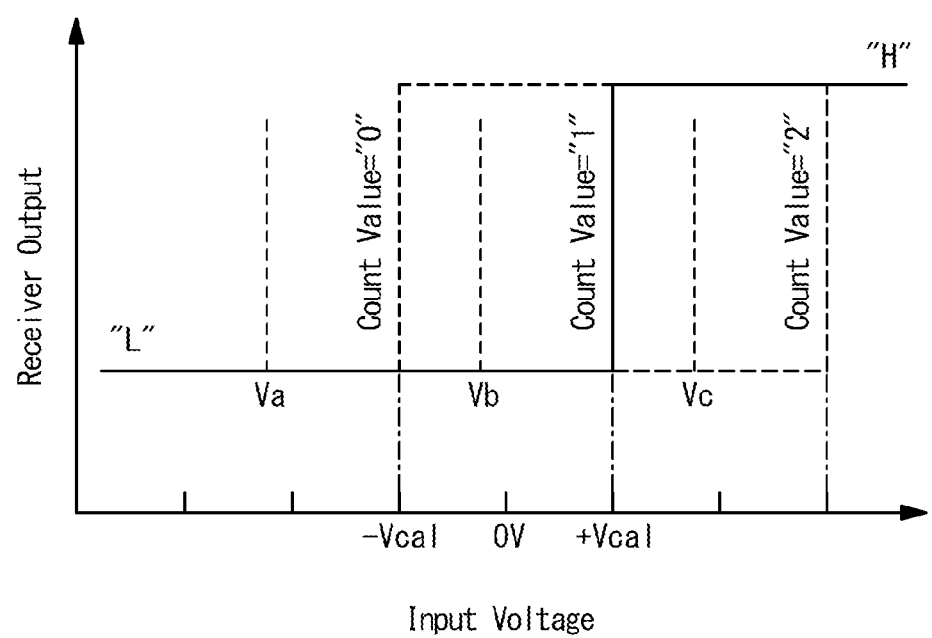
FIG. 12 illustrates example intrinsic input offsets of a receiver, according to one or more embodiments.

In the following, a description is given of example operations of the integrated circuit 100 including the counter circuitry 112 illustrated in FIG. 11 for the following three cases (also see FIG. 12).

Case #1) The intrinsic offset voltage of the receiver 106 is Va that is lower than −Vcal.
Case #2) The intrinsic offset voltage of the receiver 106 is Vb that is between −Vcal and +Vcal.
Case #3) The intrinsic offset voltage of the receiver 106 is Vc that is higher than +Vcal.

It is noted that −Vcal and +Vcal are the first extrinsic offset voltages for the count values "0" and "1" used in the calibration mode as illustrated in FIG. 7A.

Figure 13A:
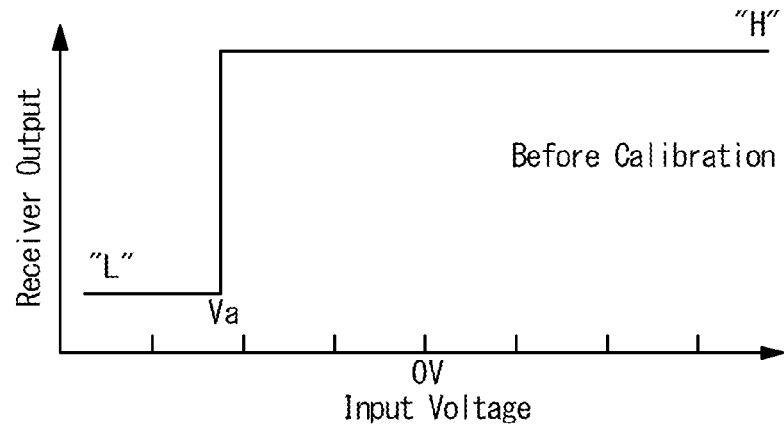
FIG. 13A illustrates an example output of a receiver before a calibration process, according to one or more embodiments.
Figure 13B:
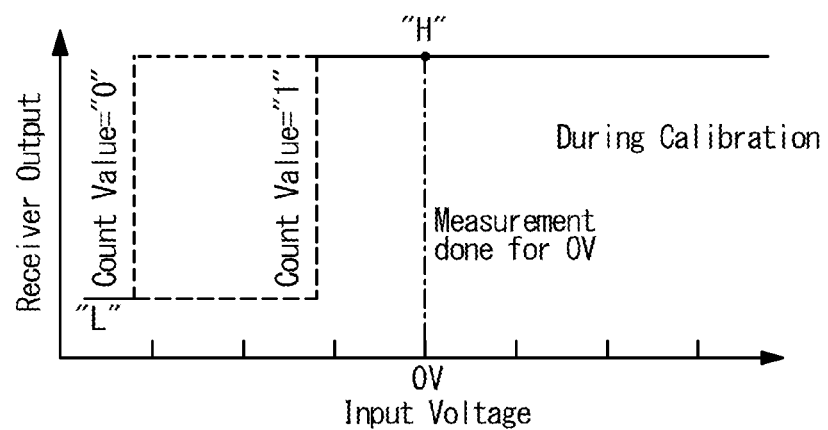
FIG. 13B illustrates an example output of the receiver during the calibration process, according to one or more embodiments.
Figure 13C:
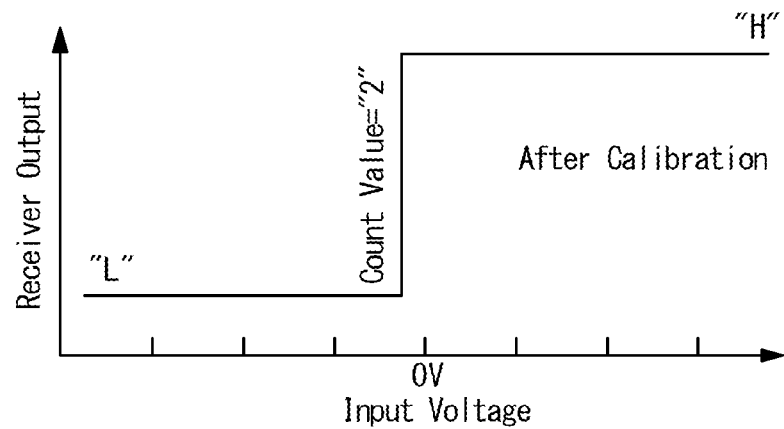
FIG. 13C illustrate an example output of the receiver after the calibration process, according to one or more embodiments.

FIGS. 13A, 13B, 13C, and 14 illustrate an example operation of the integrated circuit 100 for case #1, according to one or more embodiments. FIG. 13A illustrates an example output of the receiver 106 before calibration. In the illustrated embodiment, the receiver 106 before calibration is configured to change the output between "L" and "H" when the input voltage to the receiver 106 crosses the voltage Va, which is lower than 0V. Upon start of a calibration process, as illustrated in FIG. 14, the counter circuitry 112 starts counting up in response to the calibration mode signal CAL_Mode being set "H". During the counting up, the offset generator 110 successively changes the extrinsic input offset applied to the differential input terminals of the receiver 106 in response to the count up of the count value, changing the input voltage at which the output of the receiver 106 changes from "H" to "L" as illustrated in FIG. 13B. Since the differential input terminals of the receiver 106 are short-circuited by the short-circuit switch circuit SW3 in response to the calibration mode signal CAL_Mode being set "H", the output of the receiver 106 is measured for the input voltage of 0V. As illustrated in FIG. 14, the output of the receiver 106 is "H" for the count values of "0" and "1", and therefore the count value of the counter circuitry 112 reaches "2" without the output of the receiver 106 changing from "H" to "L". Accordingly, the count value of the counter circuitry 112 is set "2" as a result of the calibration process. After the calibration process, the offset generator 110 generates and applies the extrinsic input offset corresponding to the count value of "2" to the differential input terminals of the receiver 106. FIG. 13C illustrates an example output of the receiver 106 after the calibration process. As the resulting input offset of the receiver 106 is the sum of the intrinsic input offset of the receiver 106 and the extrinsic input offset generated by the offset generator 110, the calibration process at least partially cancels the intrinsic input offset of the receiver 106.

Figure 15A:
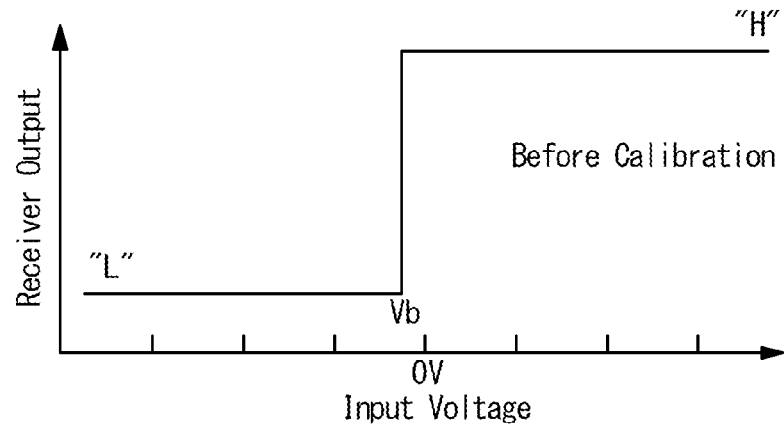
FIG. 15A illustrates an example output of a receiver before a calibration process, according to one or more embodiments.
Figure 15B:
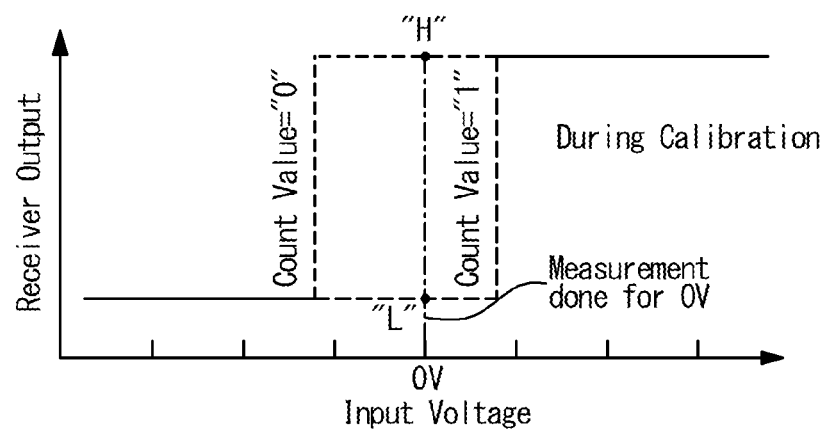
FIG. 15B illustrates an example output of the receiver during the calibration process, according to one or more embodiments.
Figure 15C:
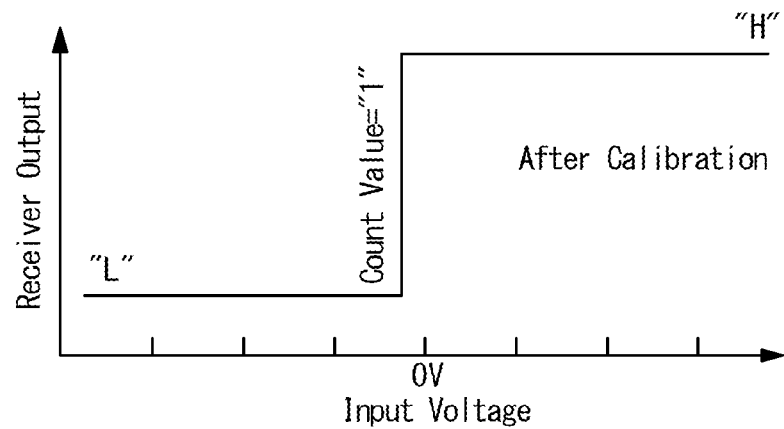
FIG. 15C illustrates an example output of the receiver after the calibration process, according to one or more embodiments.
Figure 16:
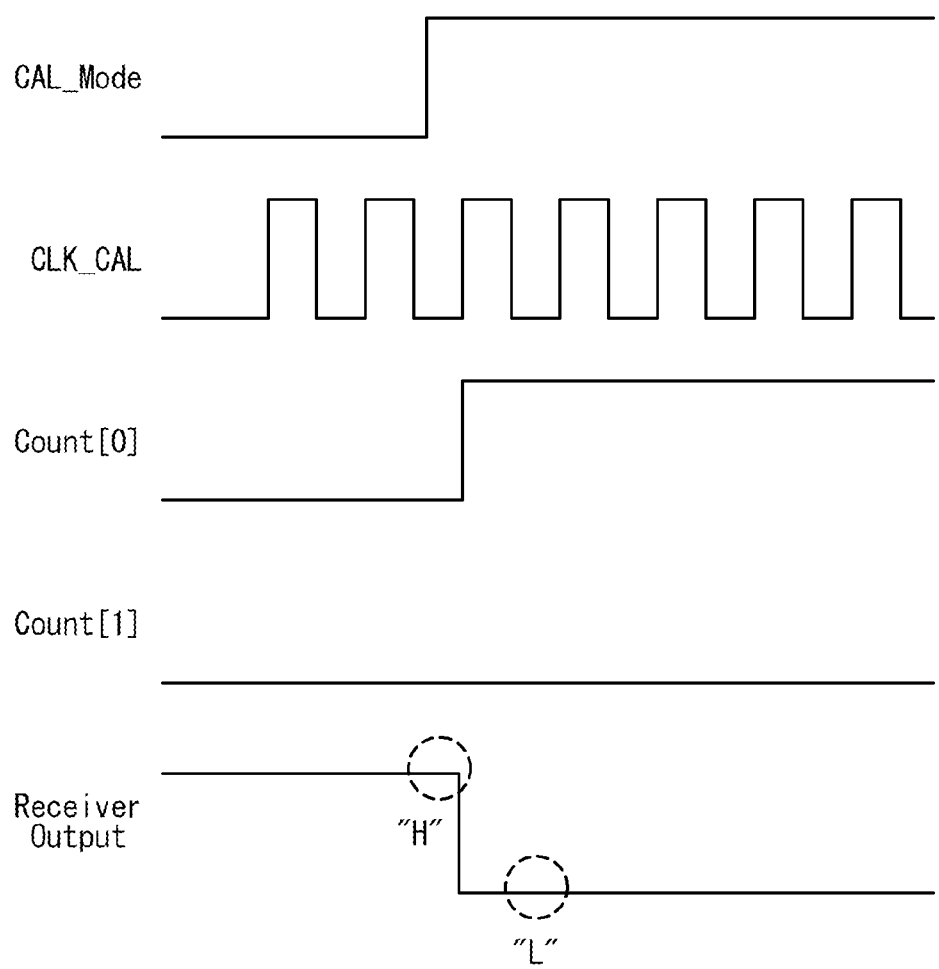
FIG. 16 illustrates an example operation of an integrated circuit, according to one or more embodiments.

FIGS. 15A, 15B, 15C, and 16 illustrate an example operation of the integrated circuit 100 for case #2, according to one or more embodiments. FIG. 15A illustrates an example output of the receiver 106 before calibration. In the illustrated embodiment, the receiver 106 before calibration is configured to change the output between "L" and "H" when the input voltage to the receiver 106 crosses the voltage Vb, which is relatively close to 0V. Upon start of a calibration process, as illustrated in FIG. 16, the counter circuitry 112 starts counting up in response to the calibration mode signal CAL_Mode being set "H". During the counting up, the offset generator 110 successively changes the extrinsic input offset in response to the count up of the count value, changing the input voltage at which the output of the receiver 106 changes from "H" to "L" as illustrated in FIG. 15B. As illustrated in FIG. 16, the output of the receiver 106 is initially "H" for the count value of "0". The output of the receiver 106 changes from "H" to "L" in response to the count value being count up to "1". Accordingly, the count value of the counter circuitry 112 is set "1" as a result of the calibration process. After the calibration process, the offset generator 110 generates and applies the extrinsic input offset corresponding to the count value of "1" to the differential input terminals of the receiver 106. FIG. 15C illustrates an example output of the receiver 106 after the calibration process, which at least partially cancels the intrinsic input offset of the receiver 106.

Figure 17A:
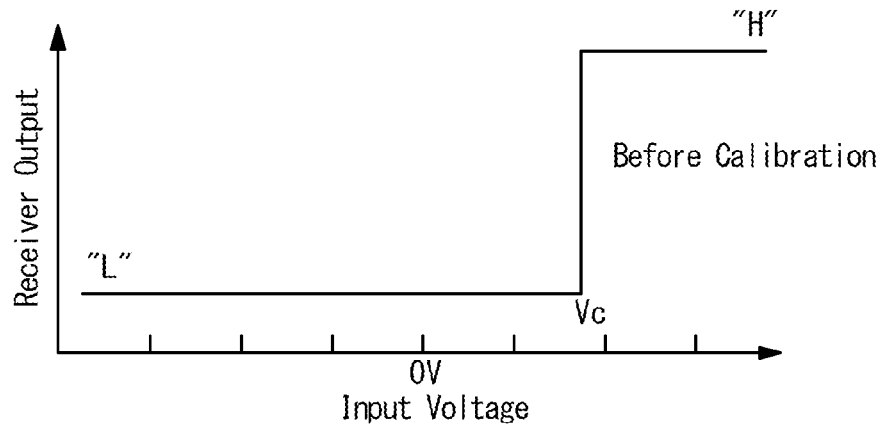
FIG. 17A illustrates an example output of a receiver before a calibration process, according to one or more embodiments.
Figure 17B:
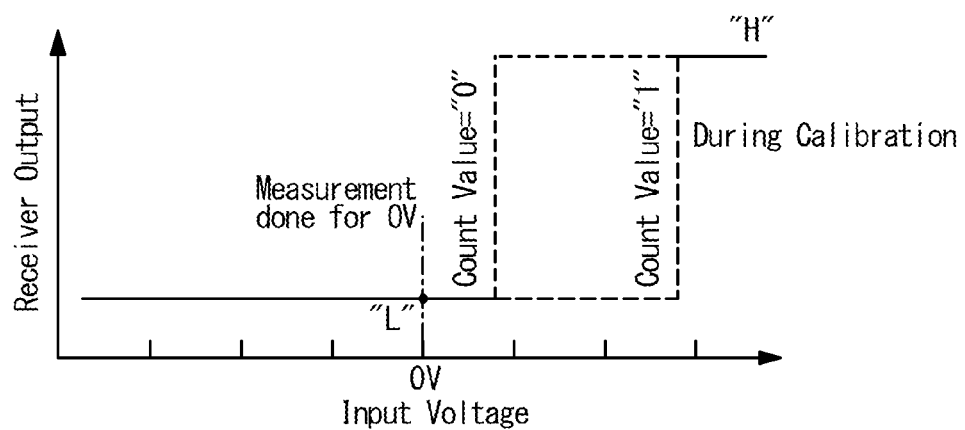
FIG. 17B illustrates an example output of the receiver during the calibration process, according to one or more embodiments.
Figure 17C:
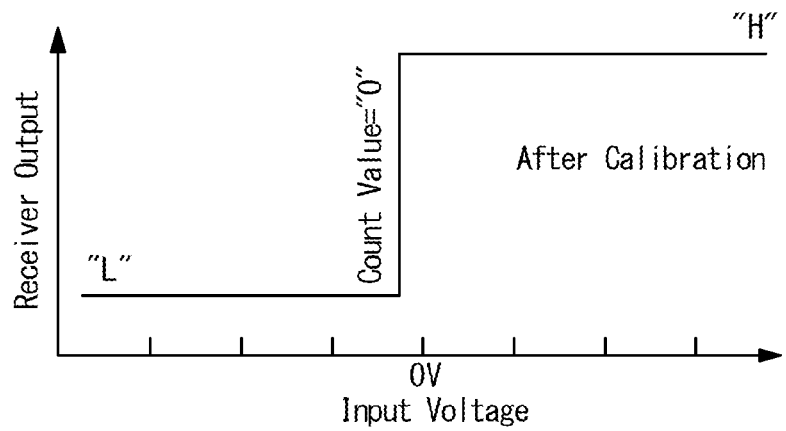
FIG. 17C illustrates an example output of the receiver after the calibration process, according to one or more embodiments.
Figure 18:
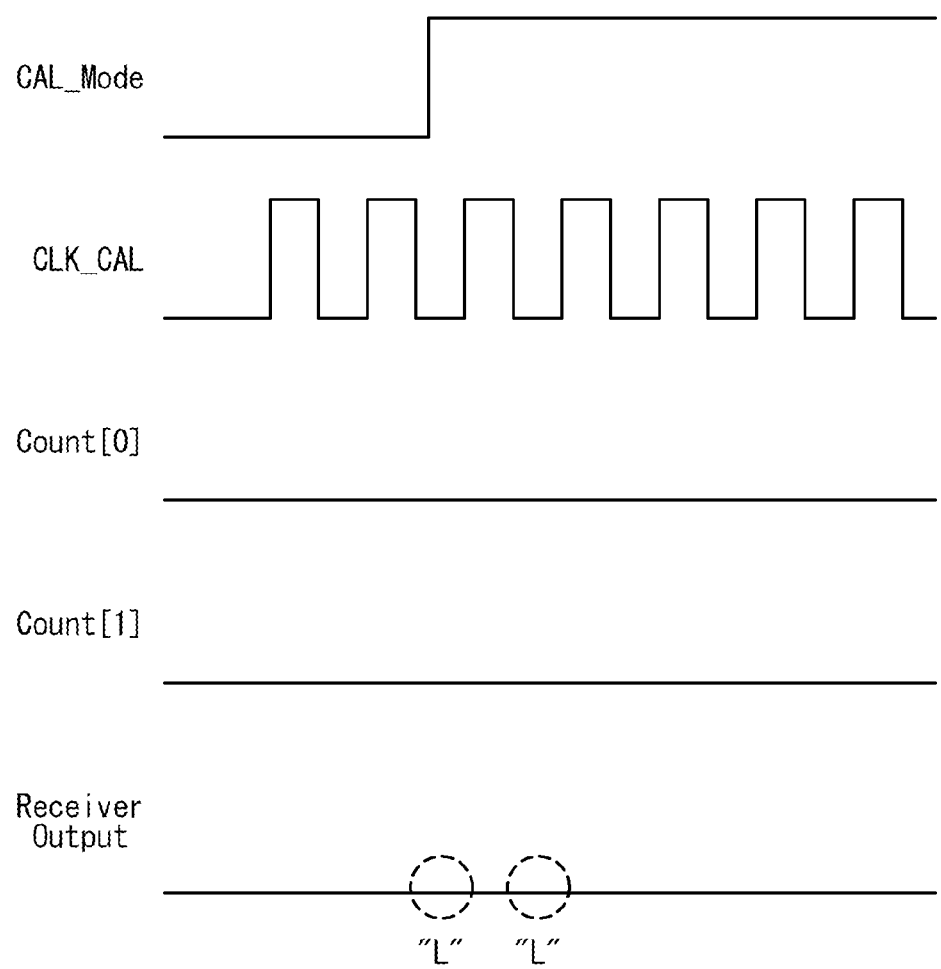
FIG. 18 illustrates an example operation of an integrated circuit, according to one or more embodiments.

FIGS. 17A, 17B, 17C, and 18 illustrate an example operation of the integrated circuit 100 for case #3, according to one or more embodiments. FIG. 17A illustrates an example output of the receiver 106 before calibration. In the illustrated embodiment, the receiver 106 is configured to change the output between "L" and "H" when the input voltage to the receiver 106 crosses the voltage Vc, which is higher than 0V. Upon start of a calibration process, as illustrated in FIG. 18, the counter circuitry 112 starts counting up in response to the calibration mode signal CAL_Mode being set "H". As illustrated in FIG. 17B, the output of the receiver 106 is "L" for the count value of "0", and accordingly the count value of the counter circuitry 112 is set "0" as a result of the calibration process. After the calibration process, the offset generator 110 generates and applies the extrinsic input offset corresponding to the count value of "0" to the differential input terminals of the receiver 106. FIG. 17C illustrates an example output of the receiver 106 after the calibration process, which at least partially cancels the intrinsic input offset of the receiver 106.

Figure 19:
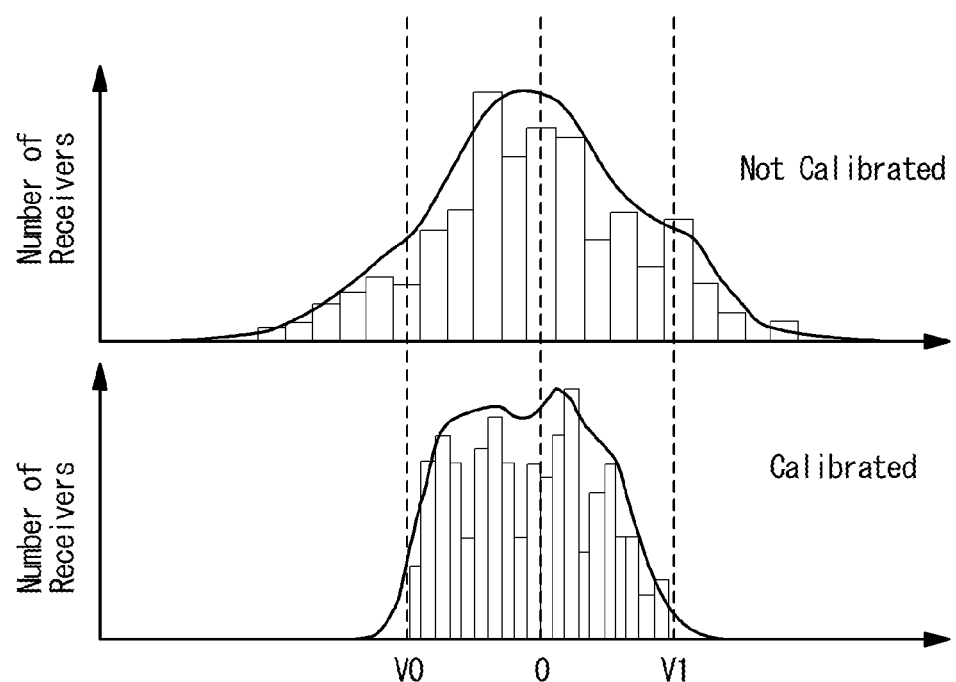
FIG. 19 illustrates example distributions of input offsets of receivers before and after a calibration process, according to one or more embodiments.

As thus discussed, the calibration process effectively calibrates any of the receivers 106 with the intrinsic input offsets of Va, Vb, and Vc. FIG. 19 illustrates example distributions of input offsets of receivers 106 before and after the calibration process, according to one or more embodiments. The illustrated distribution was obtained through a Monte Carlo simulation. The Monte Carlo simulation have proved the calibration process effectively narrows the range of the resulting input offsets of the receivers 106 around 0V.

Figure 20:
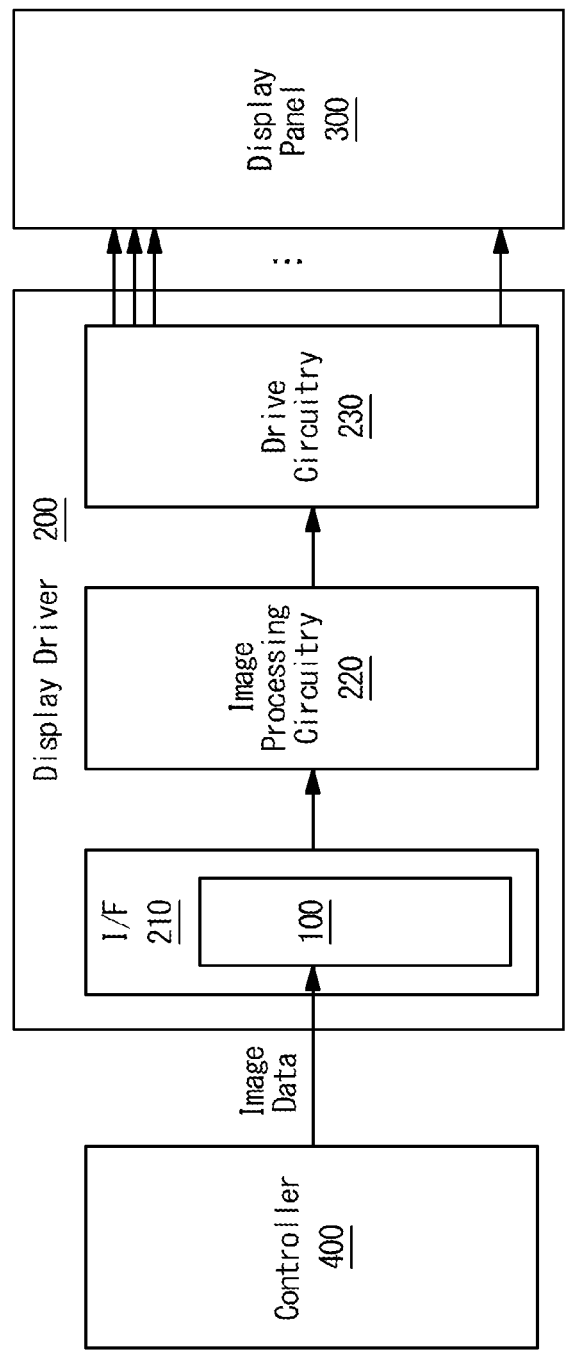
FIG. 20 illustrates an example configuration of a display driver, according to one or more embodiments.

FIG. 20 illustrates an example use of the above-described integrated circuit 100, according to one or more embodiments. In the illustrated embodiment, the integrated circuit 100 is integrated in a display driver 200 configured to drive a display panel 300 based on image data received from a controller 400. The image data may be transmitted to the display driver 200 in accordance with the MIPI D-PHY protocol or the MIPI C-PHY protocol. The display driver 200 includes interface (I/F) circuitry 210, image processing circuitry 220, and drive circuitry 230. The interface circuitry 210 incorporates the integrated circuit 100 described in the above embodiments to receive the image data from the controller 400 with the receivers 106 (illustrated in FIG. 1). The outputs of the receivers 106 include the image data and the drive circuitry 230 is configured to update the display panel 300 based on the outputs of the receivers 106.

In one implementation, the interface circuitry 210 may be configured to forward the image data to the image processing circuitry 220. In other embodiments, the interface circuitry 210 may be configured to process the image data and forward the processed image data to the image processing circuitry 220. The image processing circuitry 220 may be configured to apply one or more desired image processes (e.g., gamma transformation, color adjustment, scaling, sub-pixel rendering, and other image processes) to the image data and provide the processed image data to the drive circuitry 230. The drive circuitry 230 may be configured to update the display panel 300 based on the processed image data received from the image processing circuitry 220. In one implementation, the drive circuitry 230 may be configured to drive source lines (which may be referred to as data lines) of the display panel 300 based on the processed image data to display an image corresponding to the image data.

Method 2100 of FIG. 21 illustrates steps for operating an integrated circuit (e.g., the integrated circuit 100 illustrated in FIGS. 1 and 3). It is noted that one or more of the steps illustrated in FIG. 21 may be omitted, repeated, and/or performed in a different order than the order illustrated in FIG. 21. It is further noted that two or more steps may be implemented at the same time.

The method 2100 includes switching, by input switch circuitry (e.g., the input switch circuitry 104 illustrated in FIGS. 1 and 2A), electrical connections between a plurality of signal inputs (e.g., the signal inputs 102) and differential input terminals of a receiver (e.g., the receiver 106) based on a communication protocol with which transmission signals are transmitted to the plurality of signal inputs at step 2102. The method 2100 further includes electrically disconnecting, by the input switch circuitry, the plurality of signal inputs from the differential input terminals of the receiver in a calibration process at step 2104. The method 2100 further includes calibrating an input offset between the differential input terminals of the receiver in the calibration process at step 2106. The differential input terminals of the receiver may be short-circuited during the calibration process.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. An integrated circuit, comprising:
   a plurality of signal inputs;
   a receiver comprising differential input terminals;
   calibration circuitry configured to calibrate an input offset between the differential input terminals of the receiver in response to the integrated circuit being placed in a calibration mode, wherein the calibration circuitry comprises:
      counter circuitry configured to determine an optimum count value in the calibration mode based on an output of the receiver, wherein the counter circuitry is configured to:
         stop counting a count value in response to a change in the output of the receiver, and
         determining the optimum count value as the count value held by the counter circuitry at the stopping of the counting, and
      an offset generator configured to adjust the input offset between the differential input terminals of the receiver based on the optimum count value, wherein the offset generator is configured to:
         sequentially select a plurality of first extrinsic input offsets in response to the count value of the counter circuitry being counted up or down in the calibration mode, and
         sequentially applying the selected first extrinsic input offsets to the differential input terminals of the receiver,
         wherein adjusting the input offset between the differential input terminals of the receiver comprises:
            selecting one of a plurality of second extrinsic input offsets based on the optimum count value, and
            applying the selected one of the plurality of second extrinsic input offsets to the differential input terminals of the receiver,
         wherein each of the plurality of second extrinsic input offsets is defined by shifting a corresponding one of the plurality of first extrinsic input offsets by a predetermined shift amount; and
   input switch circuitry configured to:
      switch electrical connections between the plurality of signal inputs and the differential input terminals of the receiver in response to the integrated circuit being placed in a mode different from the calibration mode, and
      electrically disconnect the plurality of signal inputs from the differential input terminals of the receiver in response to the integrated circuit being placed in the calibration mode.

2. The integrated circuit of claim 1, further comprising:
   short-circuit switch circuitry configured to short-circuit the differential input terminals of the receiver in the calibration mode.

3. The integrated circuit of claim 2, wherein short-circuiting the differential input terminals of the receiver comprises short-circuiting the differential input terminals of the receiver to a ground voltage.

4. The integrated circuit of claim 2, wherein short-circuiting the differential input terminals of the receiver comprises short-circuiting the differential input terminals of the receiver to a common-mode voltage.

5. The integrated circuit of claim 1, wherein switching the electrical connections between the plurality of signal inputs and the differential input terminals of the receiver comprises:
   electrically connecting two of the plurality of signal inputs to the differential input terminals of the receiver based on a communication protocol with which transmission signals are transmitted to the plurality of signal inputs.

6. The integrated circuit of claim 1, wherein switching the electrical connections between the plurality of signal inputs and the differential input terminals of the receiver comprises:
   electrically connecting a first combination of two of the plurality of signal inputs to the differential input terminals of the receiver to achieve data transmission in accordance with a first protocol; and
   electrically connecting a second combination of two of the plurality of signal inputs to the differential input terminals of the receiver to achieve data transmission in accordance with a second protocol, the second combination being different from the first combination.

7. The integrated circuit of claim 6, wherein the first protocol is a mobile industry processor interface (MIPI) D-PHY protocol, and the second protocol is a MIPI C-PHY protocol.

8. The integrated circuit of claim 1, wherein the counter circuitry is further configured to:
   start counting a count value in response to the integrated circuit being placed in the calibration mode.

9. The integrated circuit of claim 1, wherein the plurality of first extrinsic input offsets is defined in equal increments.

10. A display driver, comprising:
    interface circuitry comprising:
       a plurality of signal inputs;
       a receiver comprising differential input terminals;
       calibration circuitry configured to calibrate an input offset of the differential input terminals of the receiver in response to the display driver being placed in a calibration mode, wherein the calibration circuitry comprises:
          counter circuitry configured to determine an optimum count value in the calibration mode based on an output of the receiver, wherein the counter circuitry is configured to:
             stop counting a count value in response to a change in the output of the receiver, and
             determining the optimum count value as the count value held by the counter circuitry at the stopping of the counting, and
          an offset generator configured to adjust the input offset between the differential input terminals of the receiver based on the optimum count value, wherein the offset generator is configured to:
             sequentially select a plurality of first extrinsic input offsets in response to the count value of the counter circuitry being counted up or down in the calibration mode, and
             sequentially applying the selected first extrinsic input offsets to the differential input terminals of the receiver,
             wherein adjusting the input offset between the differential input terminals of the receiver comprises:

selecting one of a plurality of second extrinsic input offsets based on the optimum count value, and applying the selected one of the plurality of second extrinsic input offsets to the differential input terminals of the receiver, wherein each of the plurality of second extrinsic input offsets is defined by shifting a corresponding one of the plurality of first extrinsic input offsets by a predetermined shift amount;

input switch circuitry configured to:

switch electrical connections between the plurality of signal inputs and the differential input terminals of the receiver in response to the display driver being placed in a mode different from the calibration mode, and electrically disconnect the plurality of signal inputs from the differential input terminals of the receiver in response to the display driver being placed in the calibration mode; and drive circuitry configured to update a display panel based on the output of the receiver.

11. The display driver of claim 10, further comprising:

short-circuit switch circuitry configured to short-circuit the differential input terminals of the receiver in the calibration mode.

12. The display driver of claim 10, wherein switching the electrical connections between the plurality of signal inputs and the differential input terminals of the receiver comprises:

electrically connecting a first combination of two of the plurality of signal inputs to the differential input terminals of the receiver to achieve data transmission in accordance with a first protocol; and electrically connecting a second combination of two of the plurality of signal inputs to the differential input terminals of the receiver to achieve data transmission in accordance with a second protocol, the second combination being different from the first combination.

13. A method, comprising:

switching, by input switch circuitry, electrical connections between a plurality of signal inputs and differential input terminals of a receiver based on a communication protocol with which transmission signals are transmitted to the plurality of signal inputs;

electrically disconnecting, by the input switch circuitry, the plurality of signal inputs from the differential input terminals of the receiver in a calibration process; and calibrating an input offset between the differential input terminals of the receiver in the calibration process, wherein calibrating the input offset between the differential input terminals of the receiver comprises:

determining an optimum count value based on an output of the receiver, wherein determining the optimum count value comprises:

stopping counting a count value in response to a change in the output of the receiver, and determining the optimum count value as the count value held by a counter circuitry at the stopping of the counting, and adjusting the input offset between the differential input terminals of the receiver based on the optimum count value, wherein adjusting the input offset between the differential input terminals of the receiver comprises:

sequentially selecting a plurality of first extrinsic input offsets in response to the count value of the counter circuitry being counted up or down, and sequentially applying the selected first extrinsic input offsets to the differential input terminals of the receiver, selecting one of a plurality of second extrinsic input offsets based on the optimum count value, and applying the selected one of the plurality of second extrinsic input offsets to the differential input terminals of the receiver, wherein each of the plurality of second extrinsic input offsets is defined by shifting a corresponding one of the plurality of first extrinsic input offsets by a predetermined shift amount.

14. The method of claim 13, further comprising:

short-circuiting the differential input terminals of the receiver in the calibration process.

15. The method of claim 13, wherein switching the electrical connections between the plurality of signal inputs and the differential input terminals of the receiver comprises:

electrically connecting a first combination of two of the plurality of signal inputs to the differential input terminals of the receiver to achieve data transmission in accordance with a first protocol; and electrically connecting a second combination of two of the plurality of signal inputs to the differential input terminals of the receiver to achieve data transmission in accordance with a second protocol, the second combination being different from the first combination.

* * * * *